US010654563B2

United States Patent
Mellor et al.

(10) Patent No.: US 10,654,563 B2
(45) Date of Patent: May 19, 2020

(54) METHOD FOR OPERATING A LANDING GEAR AND AN AIRCRAFT INCLUDING THE LANDING GEAR

(71) Applicant: The Boeing Company, Chicago, IL (US)

(72) Inventors: Mitchell Mellor, Bothell, WA (US); Brian Hansen, Lake Stevens, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/368,322

(22) Filed: Mar. 28, 2019

(65) Prior Publication Data

US 2019/0217946 A1 Jul. 18, 2019

Related U.S. Application Data

(63) Continuation of application No. 15/255,698, filed on Sep. 2, 2016, now Pat. No. 10,293,920.

(51) Int. Cl.
| | |
|---|---|
| *B64C 25/26* | (2006.01) |
| *B64C 25/12* | (2006.01) |
| *B64C 25/20* | (2006.01) |
| *F16H 21/06* | (2006.01) |
| *F16H 21/44* | (2006.01) |

(52) U.S. Cl.
CPC ............. *B64C 25/26* (2013.01); *B64C 25/12* (2013.01); *B64C 25/20* (2013.01); *F16H 21/06* (2013.01); *F16H 21/44* (2013.01); *Y02T 50/44* (2013.01)

(58) Field of Classification Search
CPC ......... B64C 25/26; B64C 25/20; F16H 21/06; F16H 21/44
See application file for complete search history.

(56) References Cited

U.S. PATENT DOCUMENTS

| | | | |
|---|---|---|---|
| 2,385,063 A | 9/1945 | Dreifke | |
| 2,661,171 A | 12/1953 | Allen | |
| 2,959,381 A * | 11/1960 | Hartel | B64C 25/20 244/102 R |
| 5,029,775 A * | 7/1991 | Abramovitsh | B64C 25/14 244/102 A |
| 7,967,245 B2 | 6/2011 | Seror-Gouget et al. | |
| 8,448,900 B2 | 5/2013 | Mellor et al. | |
| 9,145,204 B2 * | 9/2015 | Ducos | B64C 25/26 |
| 2014/0263833 A1 | 9/2014 | Brighton et al. | |
| 2015/0314860 A1 | 11/2015 | Henrion et al. | |
| 2016/0137295 A1 | 5/2016 | Bond et al. | |

FOREIGN PATENT DOCUMENTS

EP 1988015 2/2011

* cited by examiner

*Primary Examiner* — Philip J Bonzell
(74) *Attorney, Agent, or Firm* — Perman & Green, LLP

(57) ABSTRACT

A method for operating a landing gear. The method includes extending an actuator to apply a force to a crank link of a toggle lock mechanism causing a mechanical unlocking of a second lock link from a fully extended position, retracting the actuator to rotate the toggle lock mechanism about a toggle lock pivot axis of a first lock link, causing rotation of the second lock link that is rotatably coupled to the first lock link so that the second lock link folds relative to the first lock link in a second rotation direction, and a toggle link of the toggle lock mechanism rotates relative to the second lock link, in the first rotation direction opposite the second rotation direction, to rotate the second lock link to a fully retracted position of the second lock link relative to the first lock link.

20 Claims, 21 Drawing Sheets

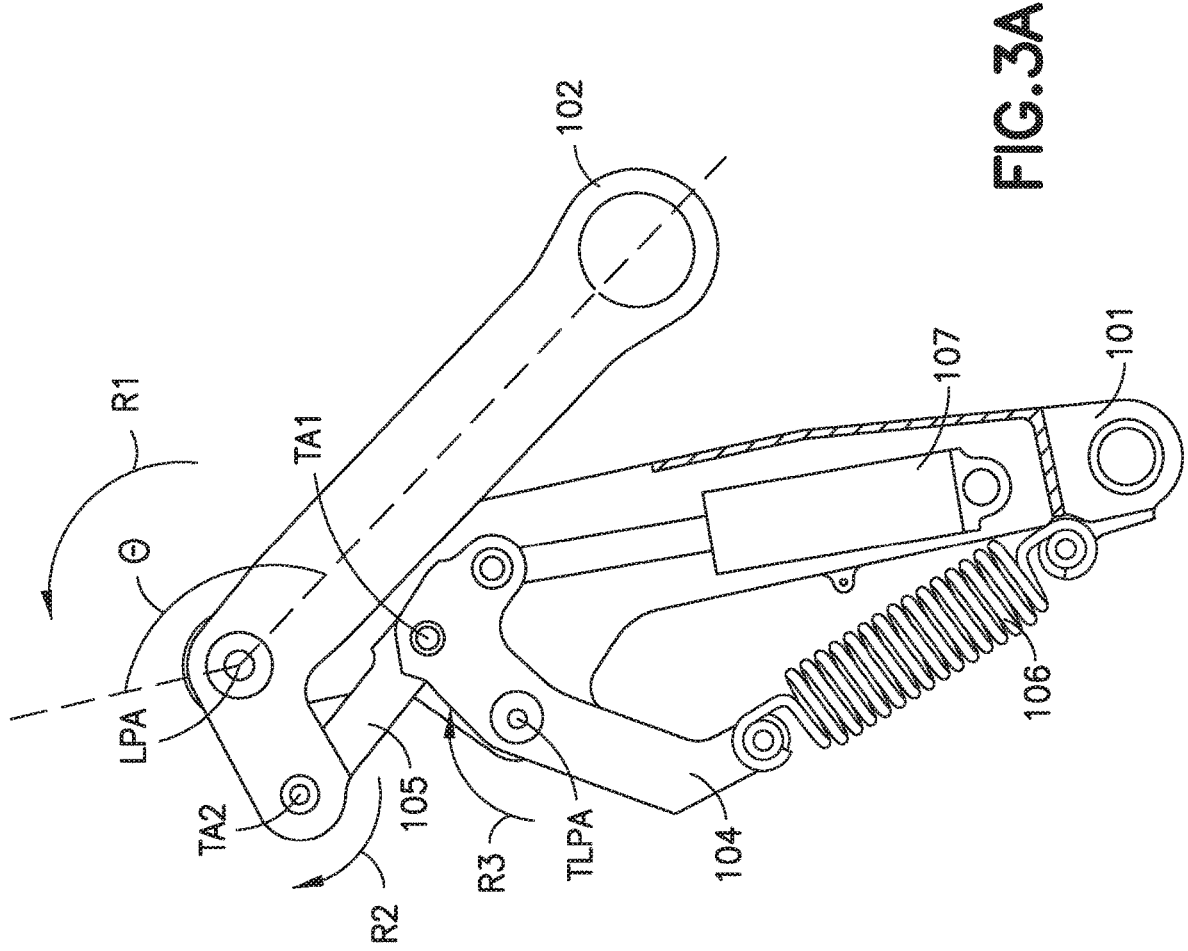

METHOD FOR OPERATING A LANDING GEAR AND AN AIRCRAFT INCLUDING THE LANDING GEAR

CROSS-REFERENCE TO RELATED APPLICATIONS

This application is a continuation of and claims the benefit of U.S. Non-Provisional patent application Ser. No. 15/255,698 filed on Sep. 2, 2016 (now U.S. Pat. No. 10/293,920 issued on May 21, 2019), the disclosure of which is incorporated by reference herein in its entirety.

BACKGROUND

1. Field

The exemplary embodiments generally relate to aircraft landing gear components and systems and in particular to landing gear lock assemblies for extending and retracting landing gear.

2. Brief Description of Related Developments

Landing gear toggle lock mechanisms must lock the landing gear side and/or drag braces into the landing gear extended position. The toggle lock mechanisms are designed to lock into place using spring force where springs apply force to the toggle locking mechanism to achieve the locked position. New landing gears, for example on commercial aircraft, require more locking force from the springs than is available with conventional landing gear toggle lock mechanisms due to space limitations onboard the aircraft and strength of materials available.

At least one known toggle lock mechanism includes an outboard lock link, an inboard lock link, an upper toggle, a lower toggle, one or more springs, and an actuator. Such a toggle lock mechanism uses the one or more springs to lock the landing gear in the landing gear extended position and uses the actuator to unlock the landing gear against the force of the one or more springs. During extension, the upper and lower toggles unfold in the same direction as the lock links. This system is configured to apply locking force to the toggle mechanism for approximately 90% of the landing gear extension stroke, whereas the force is only used in the last approximately 10% of the landing gear extension stroke. Springs for this toggle lock mechanism have a much longer spring stroke than may be necessary, which can waste a majority of the spring stroke and thus, wasting a majority of the energy stored in the springs. Also, in such landing gear toggle lock mechanisms, the springs are under load (e.g., extended) while the landing gear is retracted reducing the life of the springs.

SUMMARY

The following is a non-exhaustive list of examples, which may or may not be claimed, of the subject matter according to the present disclosure.

One example of the subject matter according to the present disclosure relates to a landing gear lock assembly including a first lock link having a first end and a second end, a second lock link having a first end and a second end, the first end of the second lock link being rotatably coupled to the second end of the first lock link so that the first and second lock links unfold relative to each other in a first rotation direction, and a toggle lock mechanism having a crank link and a toggle link rotatably coupled to each other at a toggle link axis, the toggle link being rotatably coupled to the second lock link, and the crank link being rotatably coupled to the first lock link so that the toggle link rotates relative to the second lock link, in a second rotation direction opposite the first rotation direction, to rotate the second lock link to a fully extended position of the second lock link relative to the first lock link, where rotation of the toggle link in the second rotation direction mechanically locks the second lock link in the fully extended position.

Another example of the subject matter according to the present disclosure relates to a method of assembling a landing gear lock assembly, the method including rotatably coupling a second end of a first lock link to a first end of a second lock link so that the first and second lock links unfold relative to each other in a first rotation direction, rotatably coupling a crank link and a toggle link of a toggle lock mechanism to each other, rotatably coupling the toggle link to the second lock link and rotatably coupling the crank link to the first lock link so that the toggle link rotates relative to the second lock link, in a second rotation direction opposite the first rotation direction, to rotate the second lock link to a fully extended position of the second lock link relative to the first lock link, and wherein the second lock link mechanically locks in the fully extended position with rotation of the toggle link in the second rotation direction.

Still another example of the subject matter according to the present disclosure relates to a method for operating a landing gear, the method including extending an actuator to rotate a toggle lock mechanism about a toggle lock pivot axis of a first lock link, causing rotation of a second lock link that is rotatably coupled to the first lock link so that the second lock link unfolds relative to the first lock link in a first rotation direction, and a toggle link of the toggle lock mechanism rotates relative to the second lock link, in a second rotation direction opposite the first rotation direction, to rotate the second lock link to a fully extended position of the second lock link relative to the first lock link, and applying a force to a crank link of the toggle lock mechanism with at least one biasing member to further rotate the toggle lock mechanism in the second rotation direction causing rotation of the second lock link to the fully extended position and causing a mechanical locking of the second lock link in the fully extended position, wherein the toggle link couples the crank link to the second lock link, the actuator is coupled to both the first lock link and the crank link, and the at least one biasing member is coupled to both the first lock link and the crank link.

BRIEF DESCRIPTION OF THE DRAWINGS

Figure 1A:
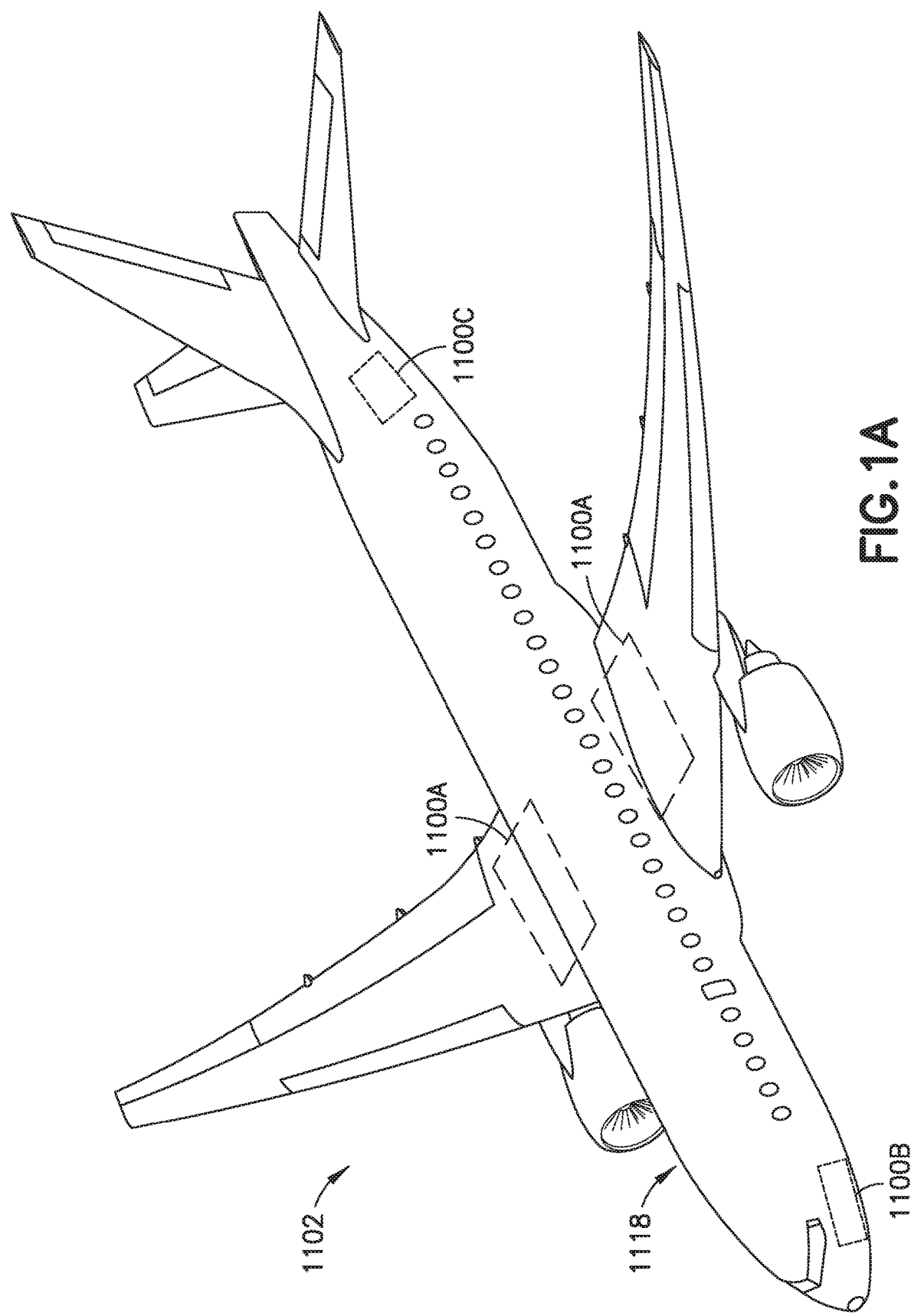
Figure 1B:
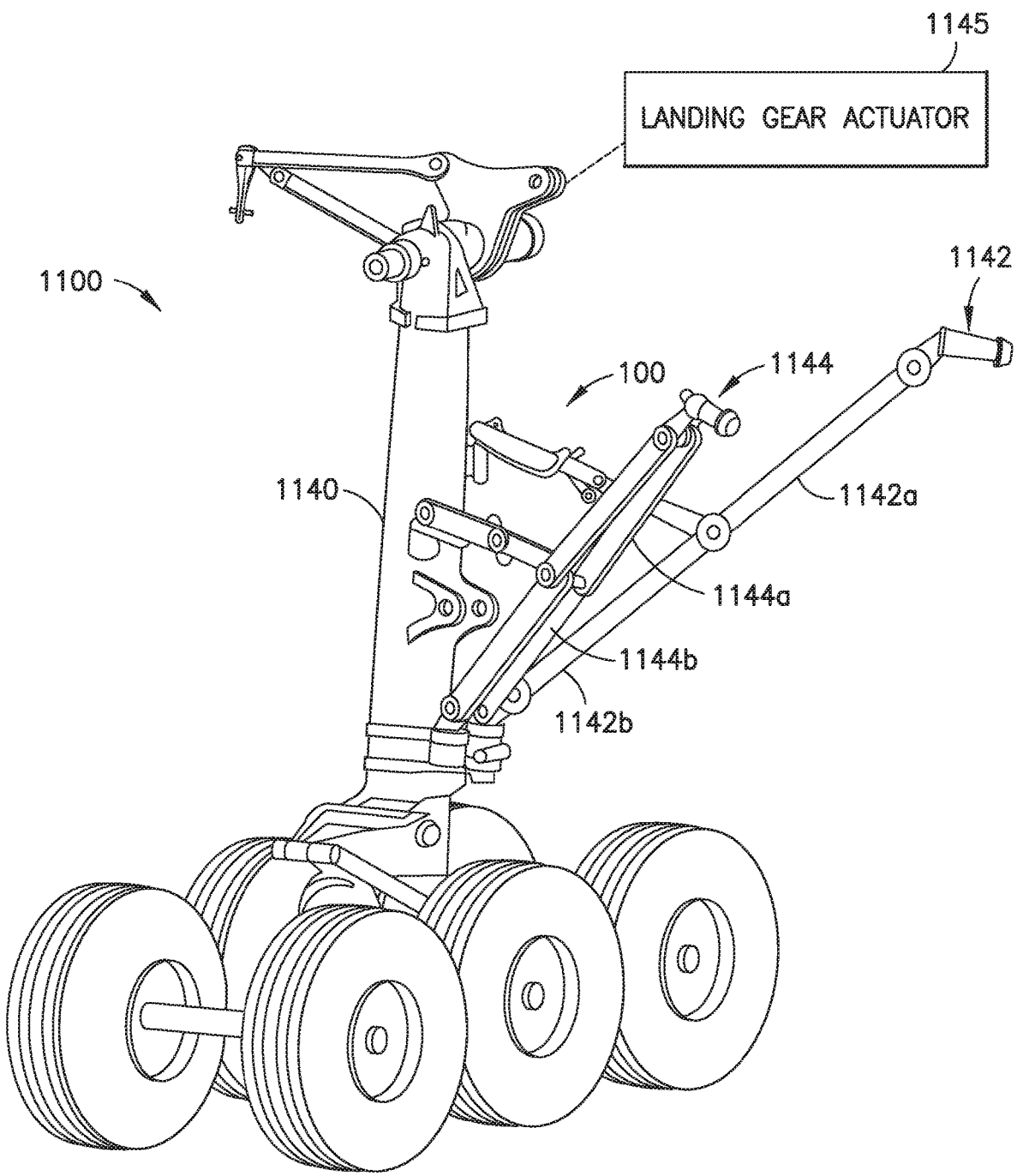
Figure 1C:
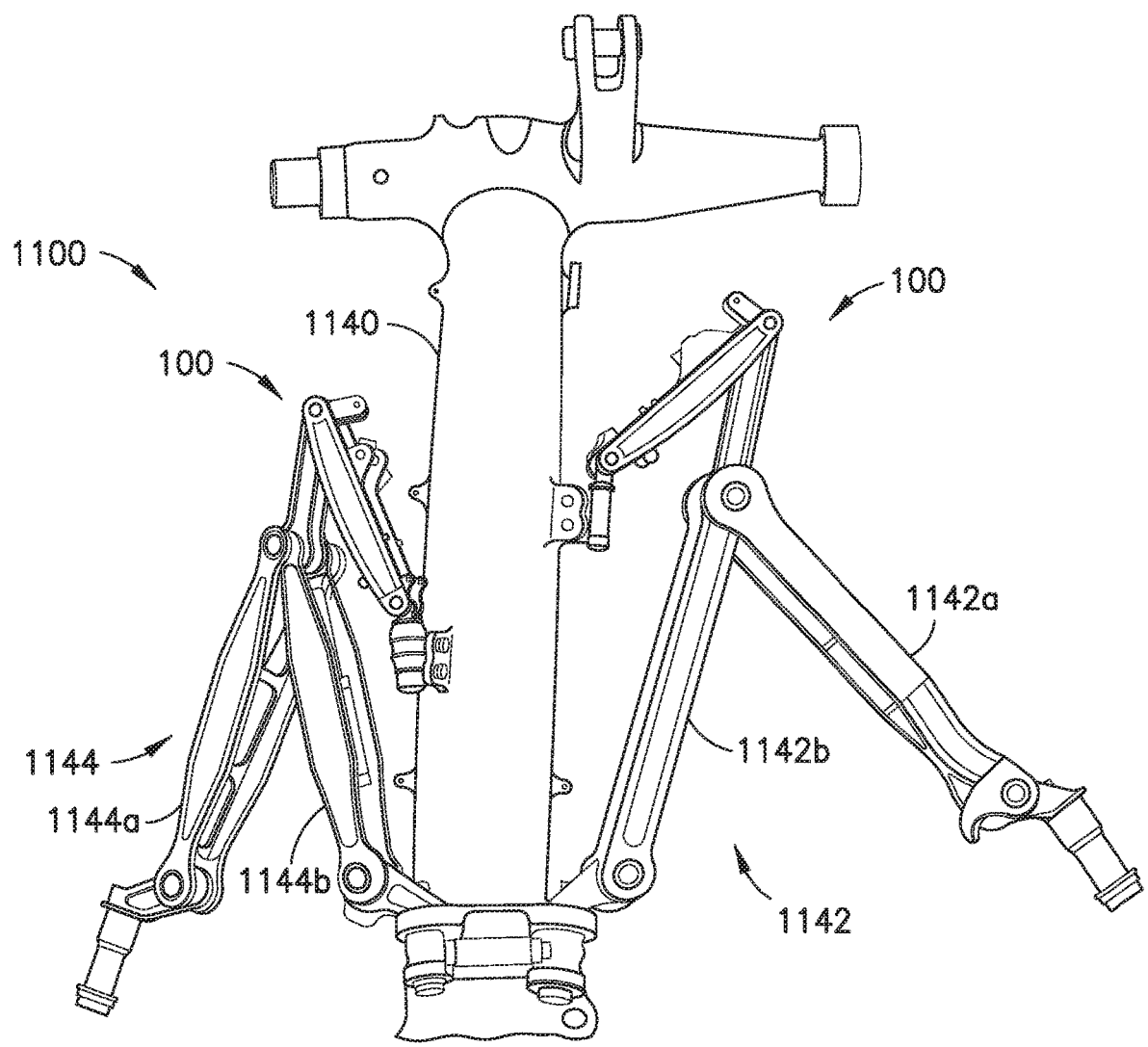
Figure 4A:
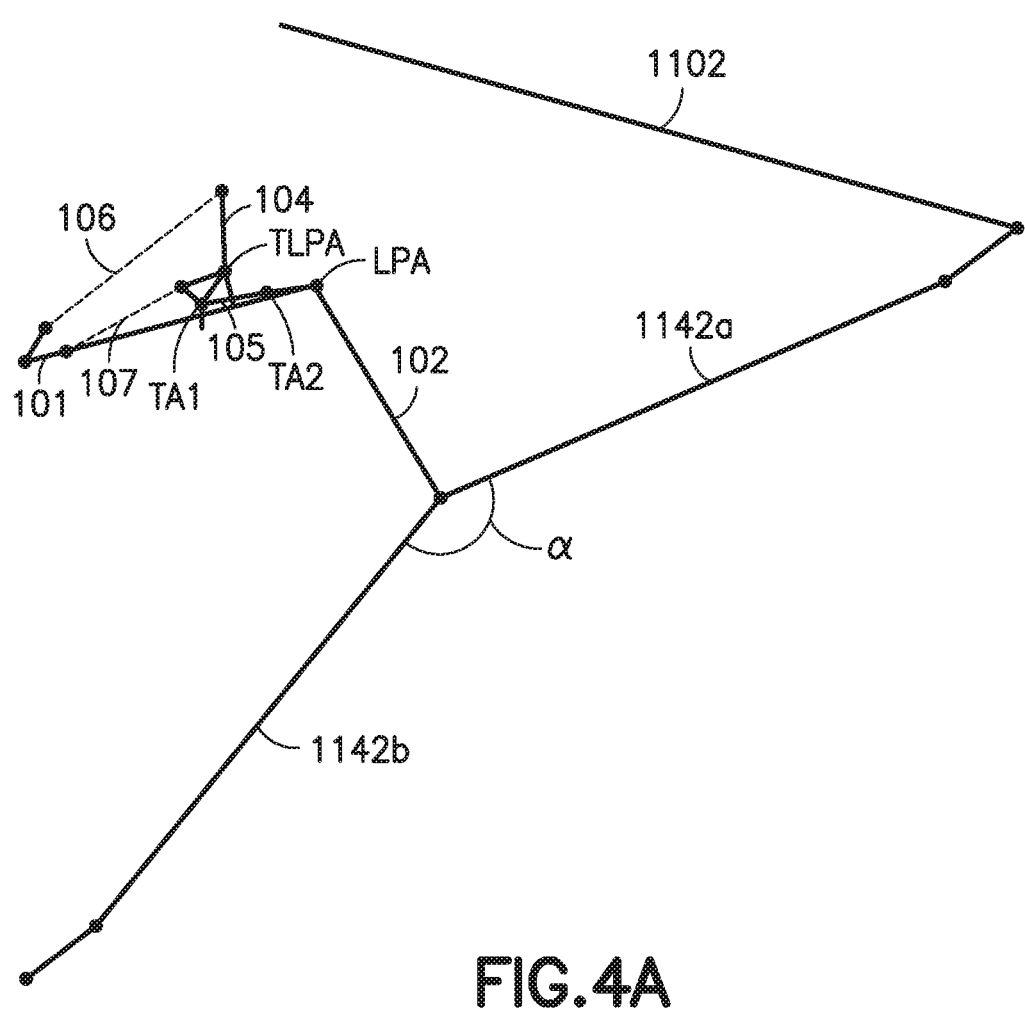
Figure 4B:
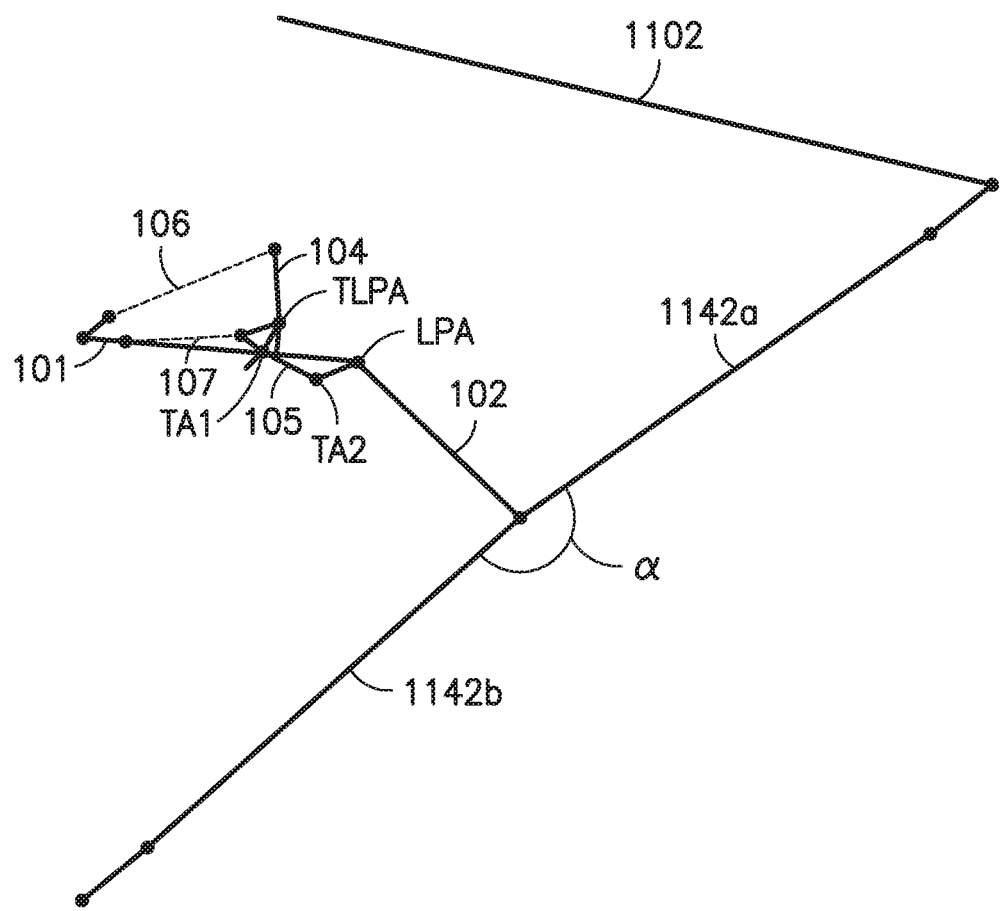
Figure 4C:
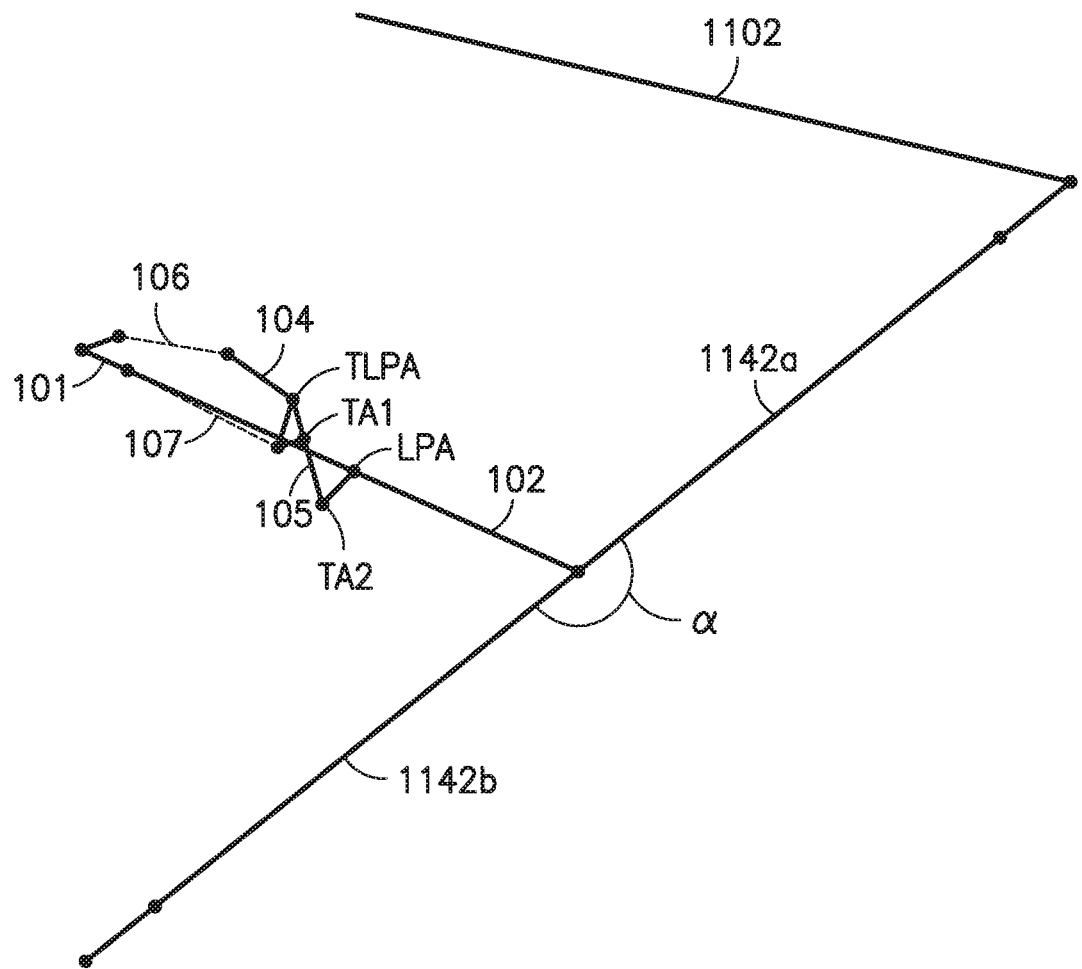
Figure 5:
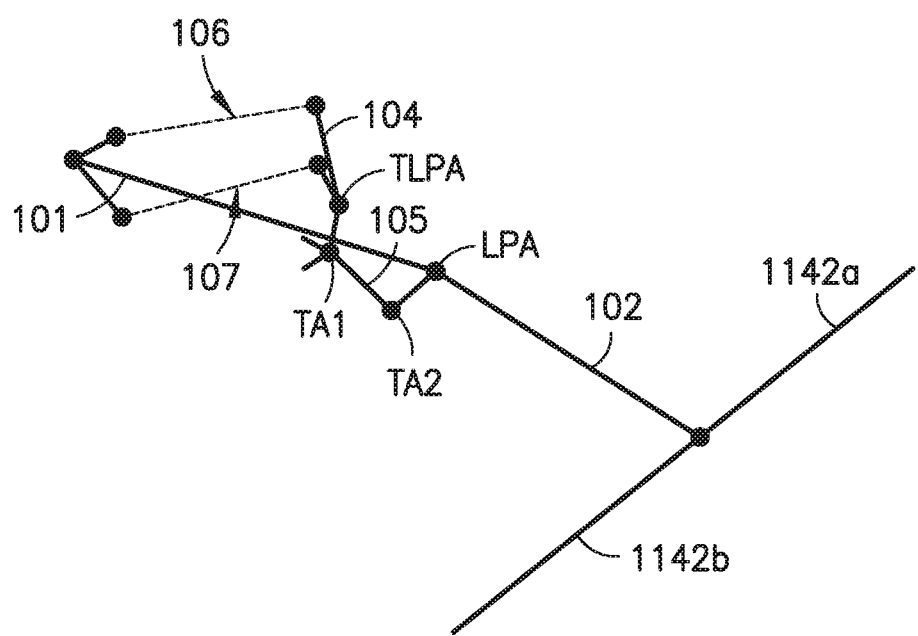
Figure 6A:
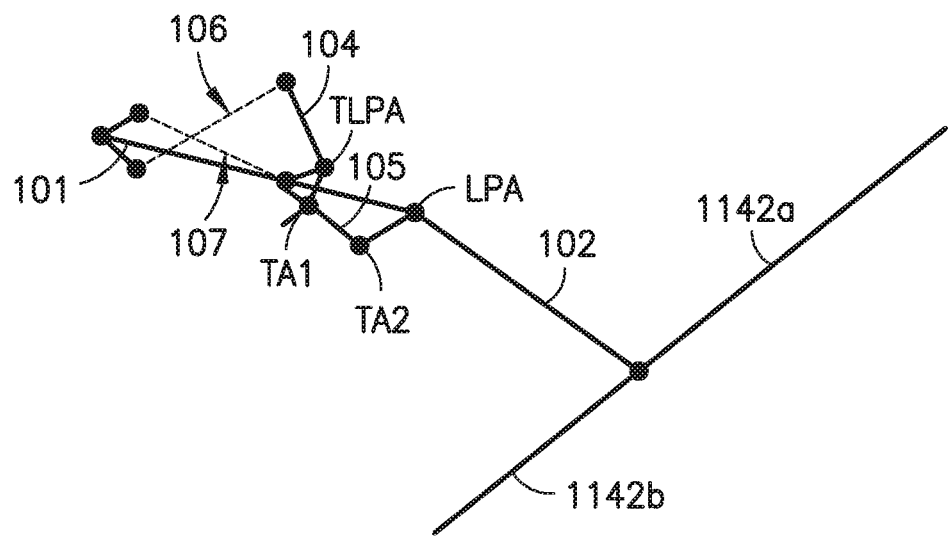
Figure 6B:
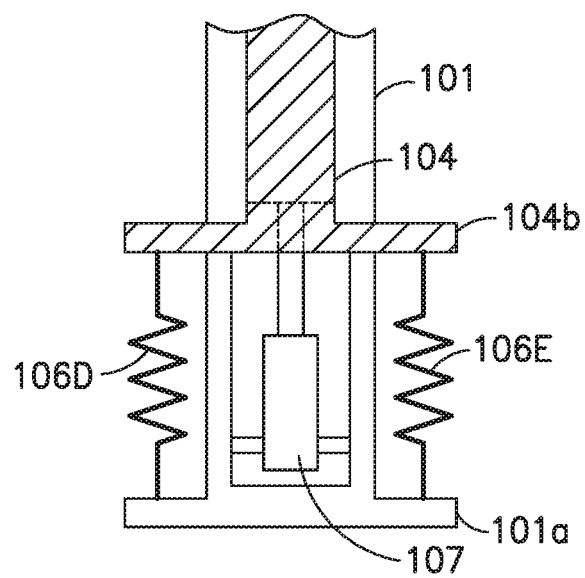
Figure 7:
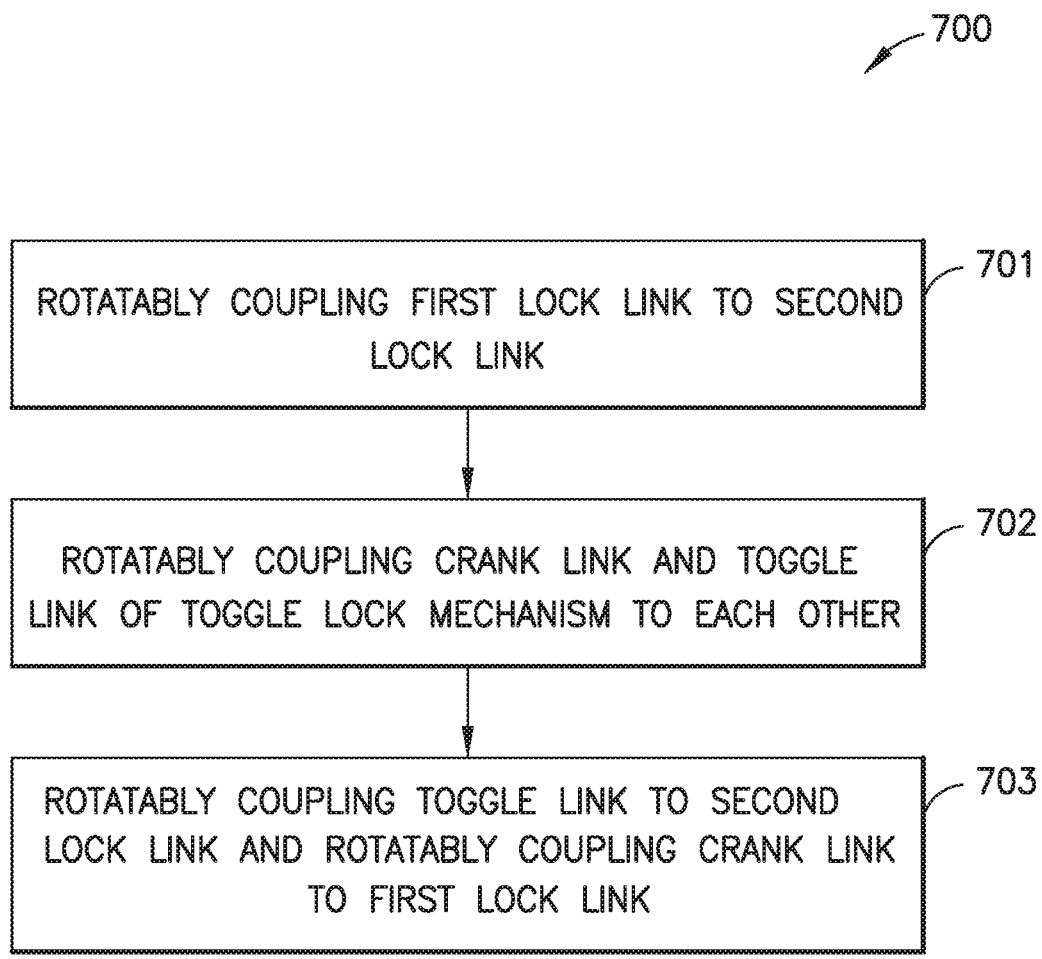
Figure 8:
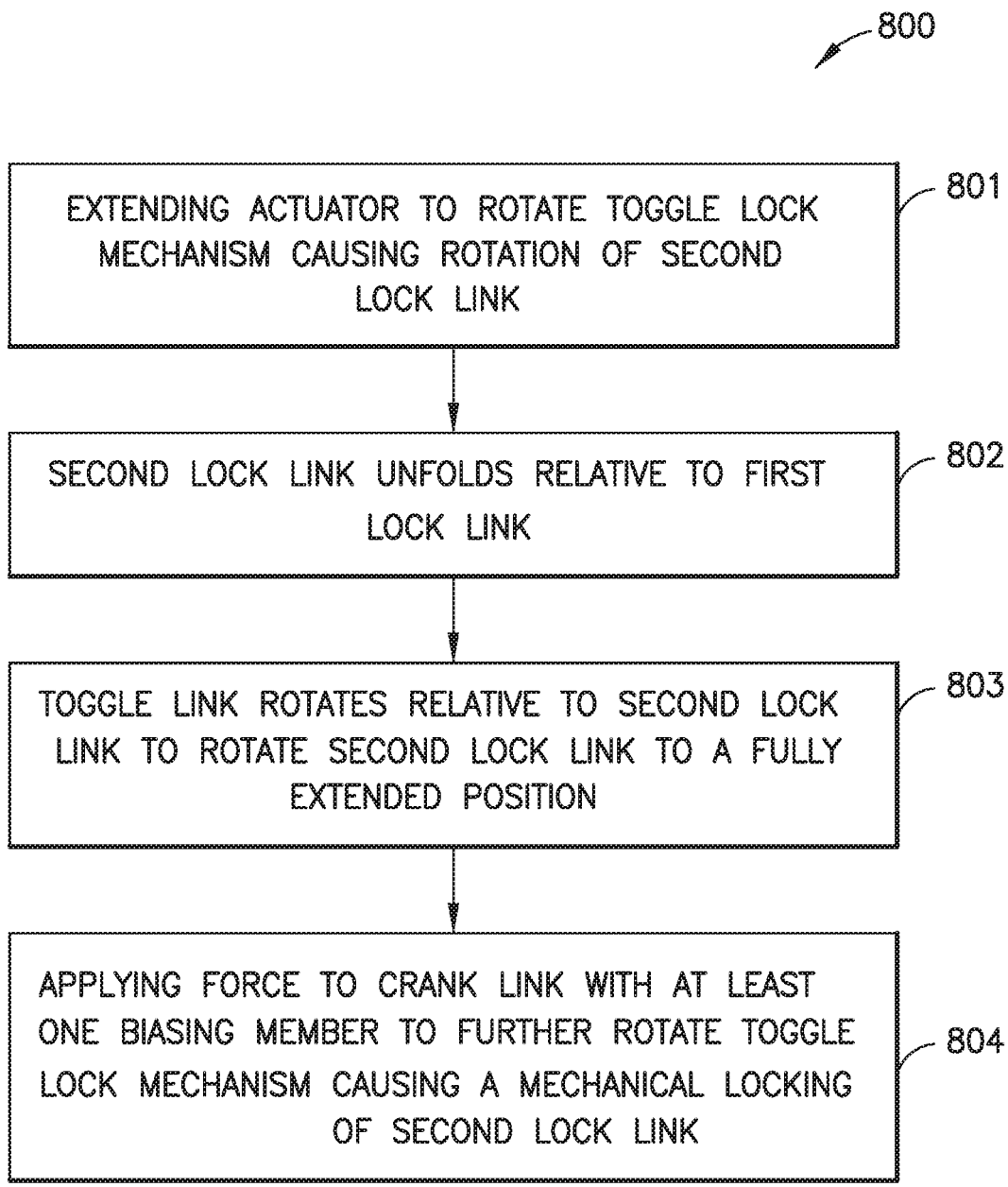
Figure 9:
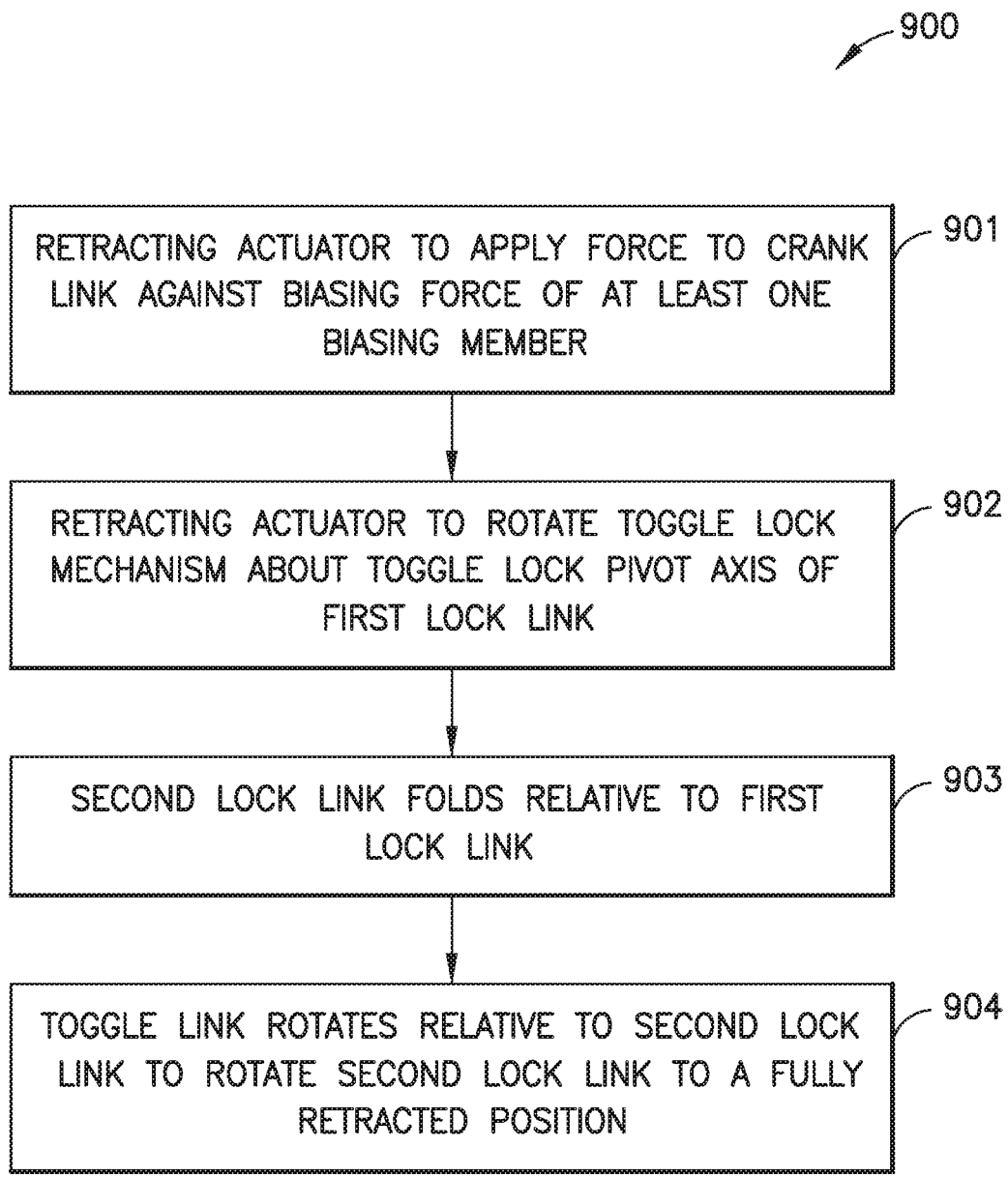
Figure 10:
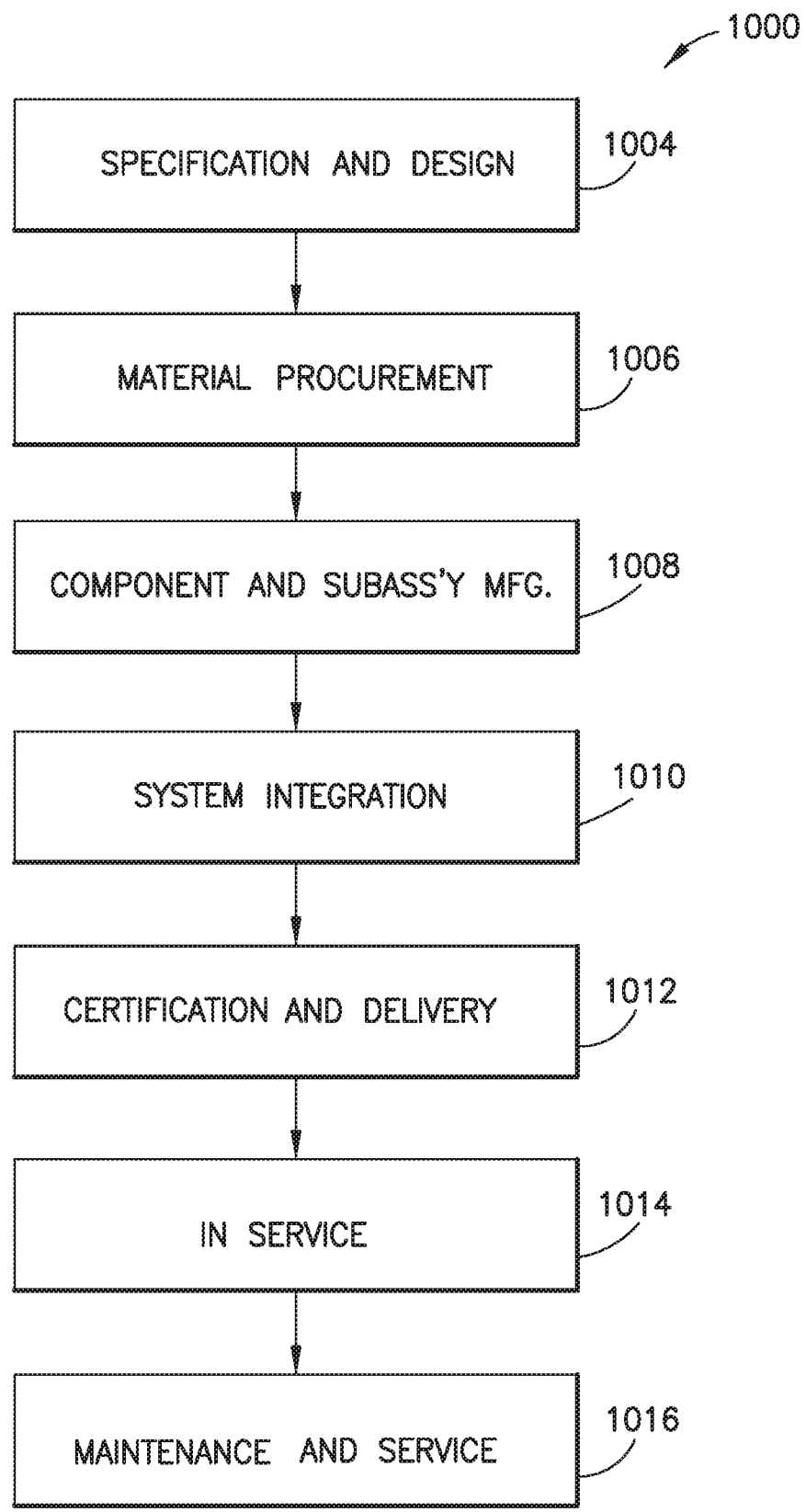

Having thus described examples of the present disclosure in general terms, reference will now be made to the accompanying drawings, which are not necessarily drawn to scale, and wherein like references characters designate the same or similar parts throughout the several views, and wherein:

FIG. 1A is a schematic illustration of an aircraft in accordance with one or more aspects of the present disclosure;

FIG. 1B is a schematic illustration of a portion of an aircraft landing gear in accordance with one or more aspects of the present disclosure;

FIG. 1C is a schematic illustration of a portion of an aircraft landing gear in accordance with one or more aspects of the present disclosure;

FIGS. 2A-2D are schematic illustrations of a landing gear lock assembly in accordance with one or more aspects of the present disclosure;

FIGS. 3A-3E are schematic illustrations of an unfolding sequence of a landing gear lock assembly in accordance with one or more aspects of the present disclosure;

FIGS. 4A-4C are schematic diagrams of the landing gear lock assembly in accordance with one or more aspects of the present disclosure;

FIG. 5 is a schematic diagram of the landing gear lock assembly in accordance with one or more aspects of the present disclosure;

FIGS. 6A-6B are schematic diagrams of the landing gear lock assembly in accordance with one or more aspects of the present disclosure;

FIG. 7 is a flow chart of a method of assembly of a landing gear lock assembly in accordance with one or more aspects of the present disclosure;

FIG. 8 is a flow chart of a method of extension of a landing gear lock assembly in accordance with one or more aspects of the present disclosure;

FIG. 9 is a flow chart of a method of retraction of a landing gear lock assembly in accordance with one or more aspects of the present disclosure;

FIG. 10 is a block diagram of aircraft production and service methodology.

DETAILED DESCRIPTION

The embodiments described herein may provide an improved landing gear toggle lock mechanism which has a more compact configuration, reduced weight and that generally applies a largest amount of spring force at a predetermined point of extension of the landing gear.

Illustrative, non-exhaustive examples, which may or may not be claimed, of the subject matter according to the present disclosure are provided below.

Referring to FIGS. 1A-1C and 2A-2D an exemplary landing gear lock assembly 100 is illustrated incorporating aspects of the present disclosure.

In one aspect, while the landing gear lock assembly 100 described herein is described with respect to a commercial passenger jet, referred to herein as the aircraft 1102, in other aspects the aircraft may be any suitable fixed wing or rotary wing aircraft. The landing gear lock assembly 100 may also be used in landing gear 1100 having any suitable position on the aircraft 1102, such as landing gear 1100A, which may be a main landing gear, located towards a longitudinal center of the aircraft 1102, nose landing gear 1100B located towards a longitudinal front of the aircraft 1102 or in other aspects, tail landing gear 1100C located towards the rear or tail of the aircraft 1102. As will be described herein the landing gear lock assembly 100 is a self-contained assembly that is configured to couple to one or more of the airframe 1118 and the landing gear components of the aircraft 1102 for locking the landing gear 1100 in an extended position. For example, the landing gear lock assembly 100 is configured to couple to a landing gear shock strut 1140 and the links 1142a-b, 1144a-b of a respective landing gear brace, such as a landing gear drag brace 1142 or landing gear side brace 1144.

In one aspect, the landing gear lock assembly 100 described herein includes a toggle tock mechanism for landing gears that use folding brace elements such as, e.g., the landing gear drag brace 1142 or landing gear side brace 1144. The landing gear lock assembly 100 uses at least one biasing member to lock the landing gear in the landing gear extended position and uses an actuator to unlock the landing gear against the force of the at least one biasing member. The landing gear lock assembly 100 can provide for the use of reduced power biasing members, when compared to conventional landing gear lock designs, has a reduced size compared to conventional landing gear lock designs, and includes fewer parts than conventional landing gear lock designs that perform the same or similar function (e.g., locking landing gear in an extended position or configuration). As such, the aspects of the landing gear lock assembly 100 described herein may reduce weight of the aircraft 1102 due, e.g., to the smaller size of the landing gear lock assembly 100, and may reduce cost of the aircraft 1102 due to, e.g., the reduced number of parts included in the landing gear lock assembly 100.

As described herein, the landing gear lock assembly 100 includes a toggle lock mechanism that unfolds in a direction opposite to the unfolding direction of the first lock link and the second lock link. The configuration of the toggle lock mechanism described herein causes lost motion in the toggle mechanism and the at least one biasing member so that the at least one biasing member substantially may not extend or retract through a portion of the landing gear extension and retraction (e.g. unfolding and folding) sequence. As described herein the at least one biasing member is in a relaxed state (e.g. substantially retracted where the biasing member may exhibit only enough force so that the at least one biasing member remains coupled to the toggle lock mechanism) when the landing gear is fully extended and when the landing gear is fully retracted.

The landing gear lock assembly 100 is configured so that the at least one biasing member contracts from a maximum length substantially at the end of the landing gear extension sequence, applying a locking force to the landing gear, so that a maximum tension force on the biasing member may be near the optimum point in landing gear extension as described herein.

Referring to FIGS. 2A-2D, in one aspect, the landing gear lock assembly 100 includes a first lock link 101 having a first end 101a and a second end 101b, a second lock link 102 having a first end 102a and a second end 102b, and a toggle lock mechanism 103. In one aspect, the landing gear lock assembly 100 also includes at least one biasing member 106 and at least one actuator 107.

In one aspect, the first end 102a of the second lock link 102 is rotatably coupled to the second end 101b of the first lock link 101 at a link pivot axis LPA. In one aspect, the link pivot axis LPA is disposed substantially adjacent the first end 102a of the second lock link 102 and the second end 101b of the first lock link 101. In one aspect, the link pivot axis LPA is disposed between the first end 102a and the second end 102b of the second lock link 102. The first and second lock links 101, 102 are rotatably coupled to each other so as to unfold relative to each other about the link pivot axis LPA, i.e., as the landing gear lock assembly 100 unfolds, the second lock link 102 rotates relative to the first lock link 101 in a first rotation direction R1.

Referring still to FIGS. 2A-2D, in one aspect, the toggle lock mechanism 103 includes a crank link 104 and a toggle link 105 and is coupled to both the first lock link 101 and the second lock link 102. In one aspect, the crank link 104 has a first end 104a and a second end 104b and a toggle lock pivot axis TLPA disposed between the first end 104a and second end 104b. The crank link 104 is rotatably coupled to the first lock link 101, between the first and second ends 101a, 101b of the first lock link 101 about the toggle lock pivot axis TLPA.

In one aspect, a first end 105a of the toggle link 105 is rotatably coupled to the crank link 104 about a first toggle link axis TA1 and a second end 105b of the toggle link is rotatably coupled to the second lock link 102 about a second toggle link axis TA2. In one aspect, the first toggle link axis TA1 is located substantially adjacent the first end 104a of the crank link 104 and adjacent the first end 105a of the toggle link 105. In one aspect, the first toggle link axis TA1 is located between the first end 104a and the toggle lock pivot axis TLPA of the crank link 104. In one aspect, the second toggle link axis TA2 is located adjacent the first end 102a of the second lock link 102 and adjacent the second end 105b of the toggle link 105.

The toggle link 105 is configured to rotate relative to the second lock link 102, in a second rotation direction R2 opposite the first rotation direction R1. Rotating the toggle link 105 relative to the second lock link 102 in the second rotation direction R2 causes the crank link 104 and the toggle link 105 of the toggle lock mechanism 103 to unfold in a rotation direction R5 opposite the first rotation direction R1, which can provide for a more compact landing gear toggle lock mechanism configuration than that of a conventional landing gear lock. As described herein, the rotation of the toggle link 105 in the direction R2, combined with the rotation of the crank link 104, rotates the second lock link 102 to a fully extended position relative to the first lock link 101 and mechanically locks the second lock link 102 in the fully extended position.

In one aspect, the mechanical locking of the second lock link 102 in the fully extended position is caused by an over center locking of the toggle link 105 and crank link 104. In one aspect, the crank link 104 includes a toggle stop 110 configured to contact the toggle link 105 at the over center locked position 100L (see FIG. 2D) of the landing gear lock assembly 100. When the toggle stop 110 is in contact with the toggle link 105, the landing gear lock assembly 100 is mechanically locked in the extended position.

Still referring to FIGS. 2A-D, the landing gear lock assembly 100 includes at least one biasing member 106 that is coupled to both the first lock link 101 and the crank link 104. In one aspect, the at least one biasing member 106 is an extension spring. In another aspect, the at least one biasing member 106 is a coil/torsion spring 106'. It should be understood that the at least one biasing member 106 may be any suitable biasing member(s) (e.g. tension, compression, or torsion) that applies a linear or rotational biasing force, e.g., moment M, between the first lock link 101 and the crank link 104.

In one aspect, a first end 106a of the at least one biasing member 106 is coupled to the first lock link 101 and a second end 106b of the at least one biasing member 106 is coupled to the crank link 104. In one aspect, the first end 106a of the at least one biasing member 106 is coupled to the first lock link 101 adjacent the first end 101a of the first lock link 101 and the second end 106b of the biasing member 106 is coupled to the crank link 104 adjacent the second end 104b of the crank link 104.

In a particular aspect, the at least one biasing member 106 is located on a side of the first lock link 101 opposite a sweep path SP of the second lock link 102, which provides clearance for the second lock link 102 to sweep or rotate into an extended or retracted configuration and also provides compactness of the landing gear lock assembly 100. Locating the at least one biasing member 106 on the side of the first lock link 101 opposite the sweep path SP of the second lock link 102 also provides for a longer crank link 104 to increase the moment M and hence increase the locking force applied by the at least one biasing member 106.

Figure 2A:
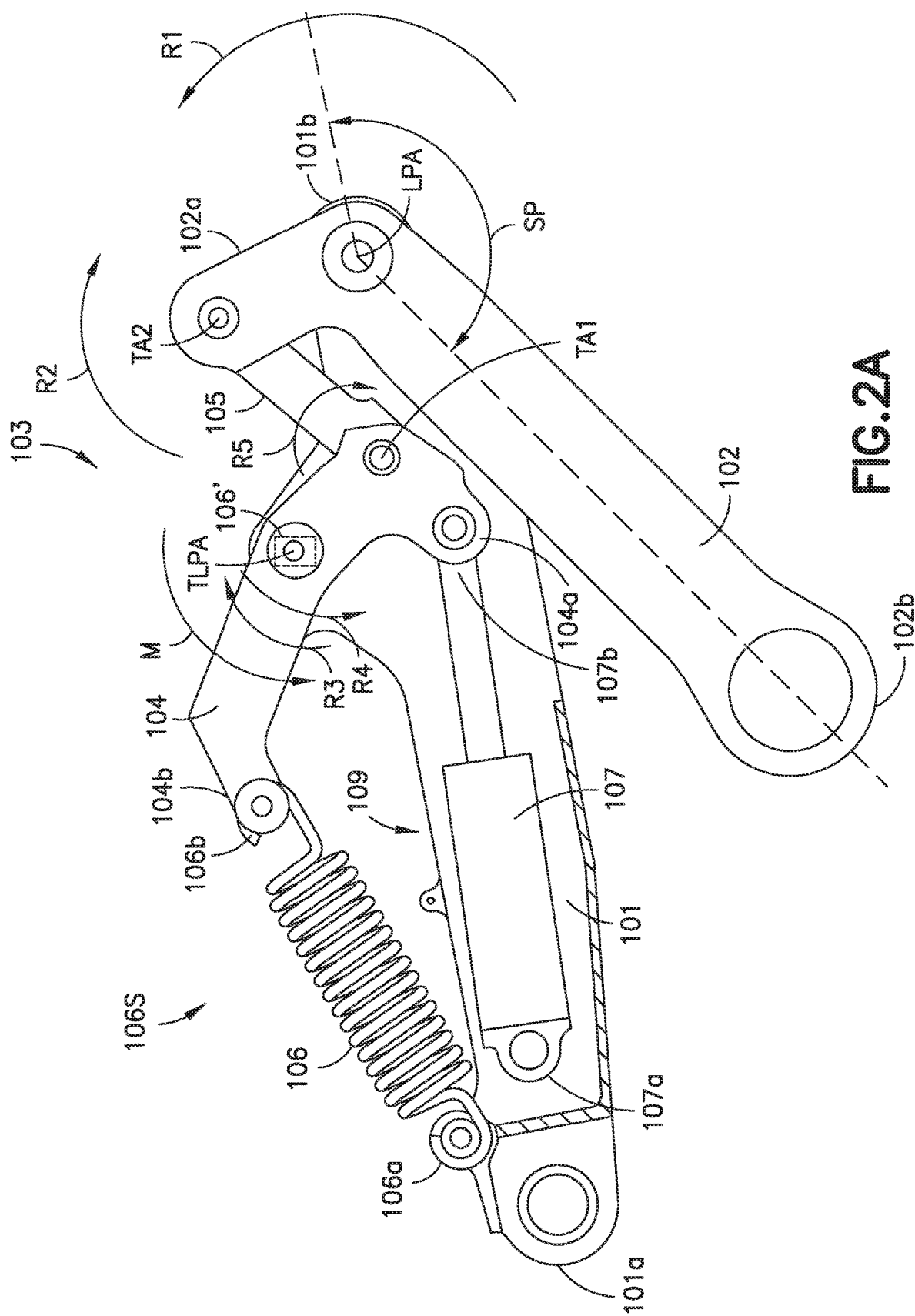
Figure 2B:
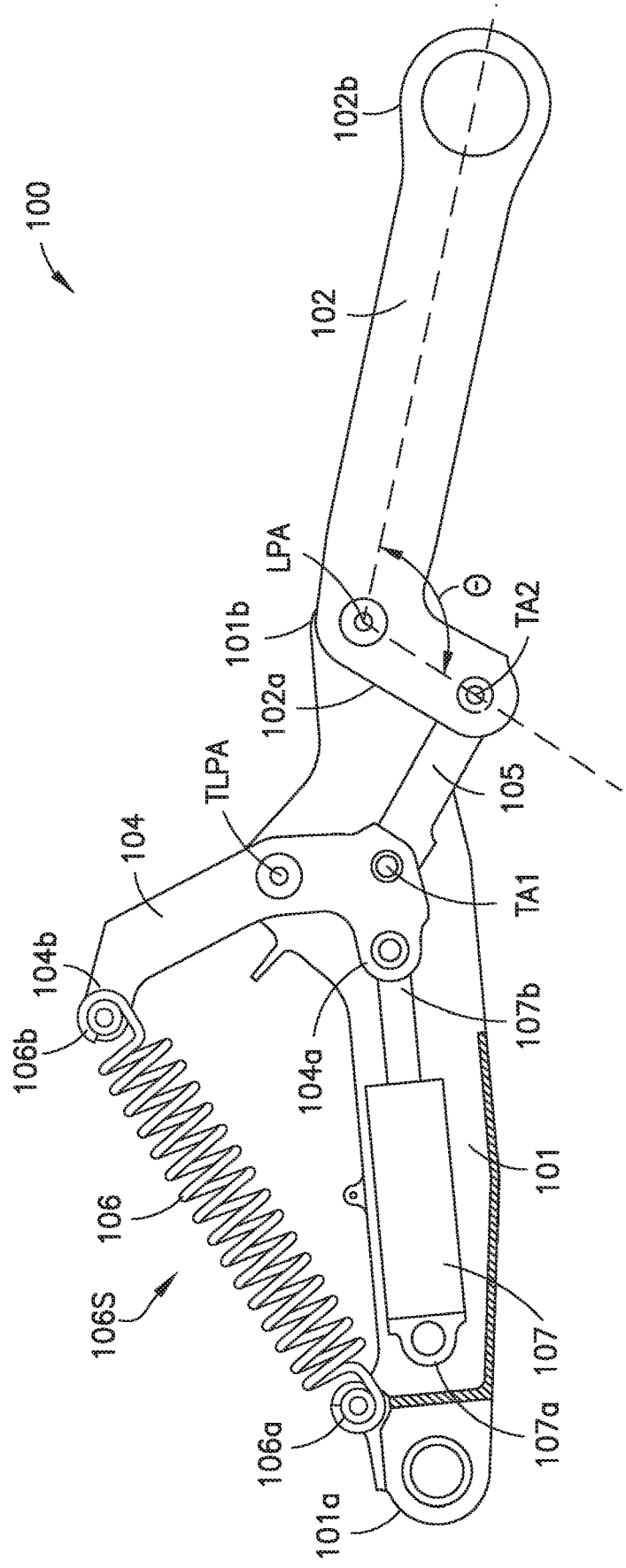

The at least one biasing member 106 is in a substantially relaxed state when the second lock link 102 is in a fully retracted position (as shown in FIG. 2A), which can provide less stress on the at least one biasing member 106, reduce fatigue on the at least one biasing member 106, and/or increase the life of the at least one biasing member 106.

Figure 3B:
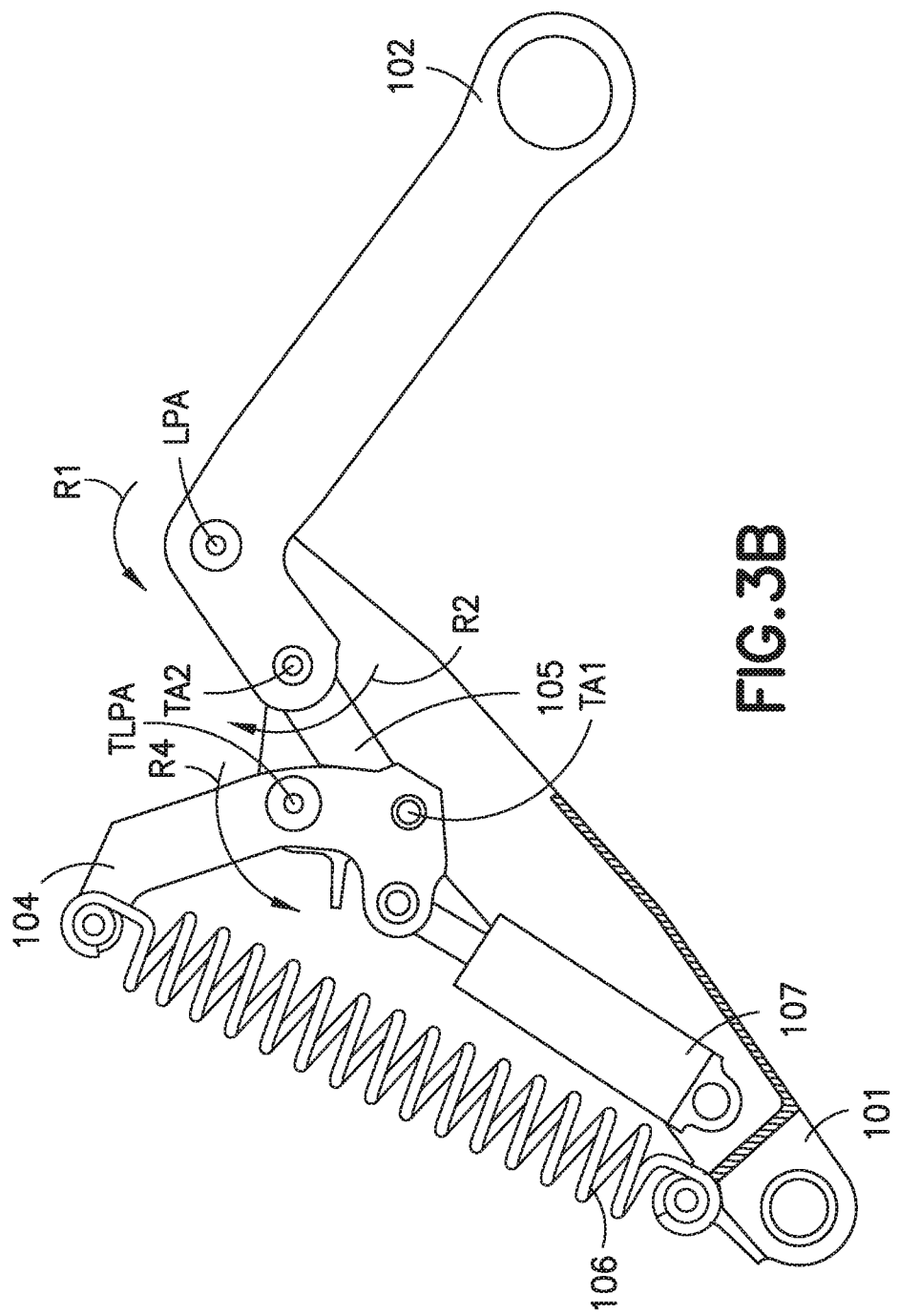
Figure 3C:
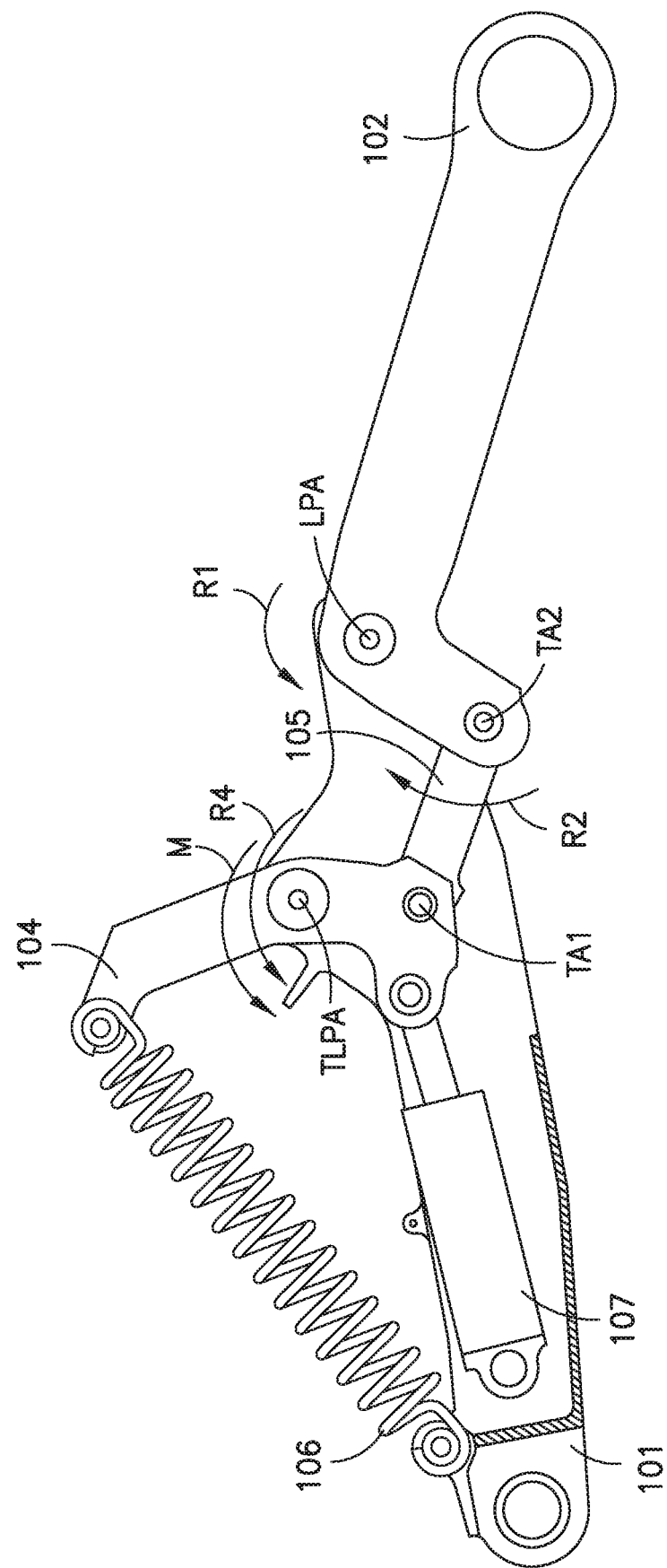
Figure 3D:
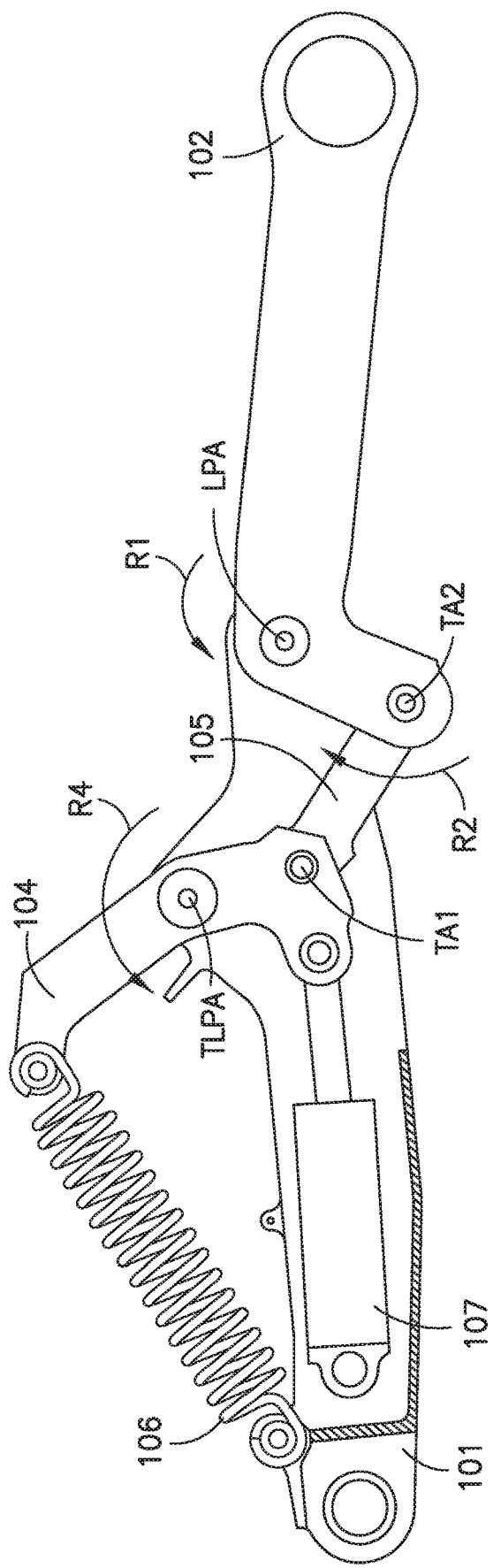
Figure 3E:
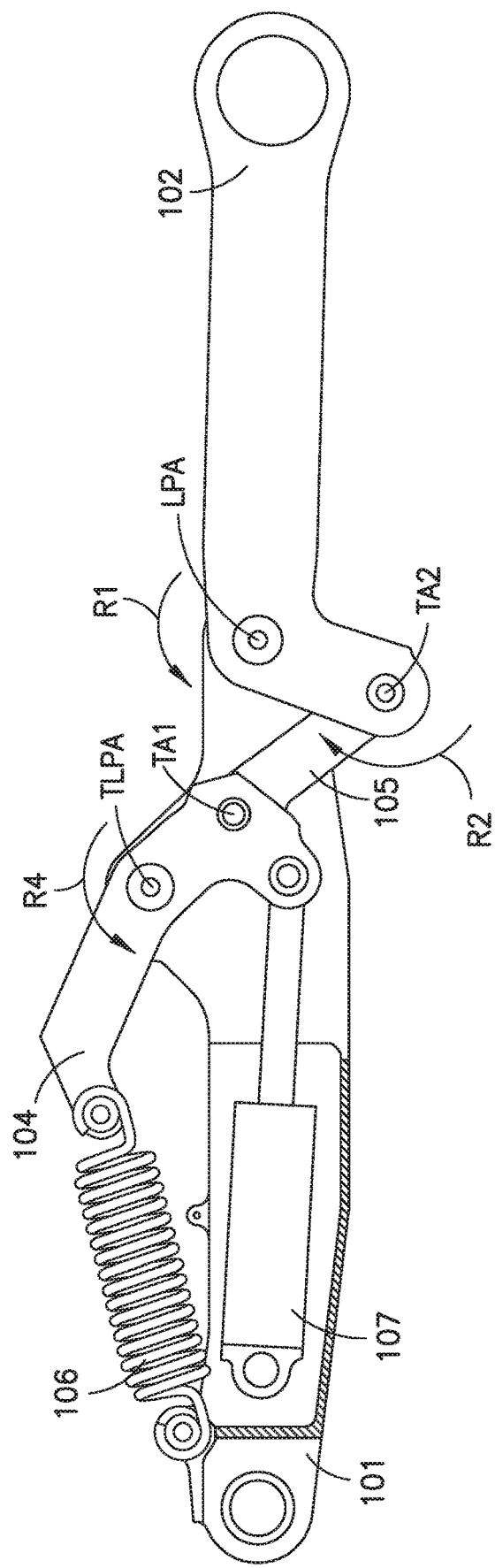

The at least one biasing member 106 is in a substantially relaxed state when the second lock link 102 is in the fully extended position (as shown in FIG. 3E) which also provides less stress on the at least one biasing member 106, reduces fatigue on the at least one biasing member 106 and increases the life of the at least one biasing member 106.

In a particular aspect, as shown in FIG. 2A and described herein, the at least one biasing member 106 is configured to apply a moment M of force to the crank link 104 of the toggle lock mechanism 103 to cause rotation of the crank link 104 about toggle lock pivot axis TLPA. Rotation of the crank link 104 in direction R4 causes toggle link 105 to push on the second lock link 102 and rotate the second lock link 102 about axis LPA to the fully extended position of the second lock link 102. It is noted that rotation of the crank link 104 to lock the toggle lock mechanism 103 causes rotation of the toggle link 105 in the direction R2, relative to the second lock link 102, which as noted here is opposite to the direction of rotation R1 of the second lock link 102.

Figure 2C:
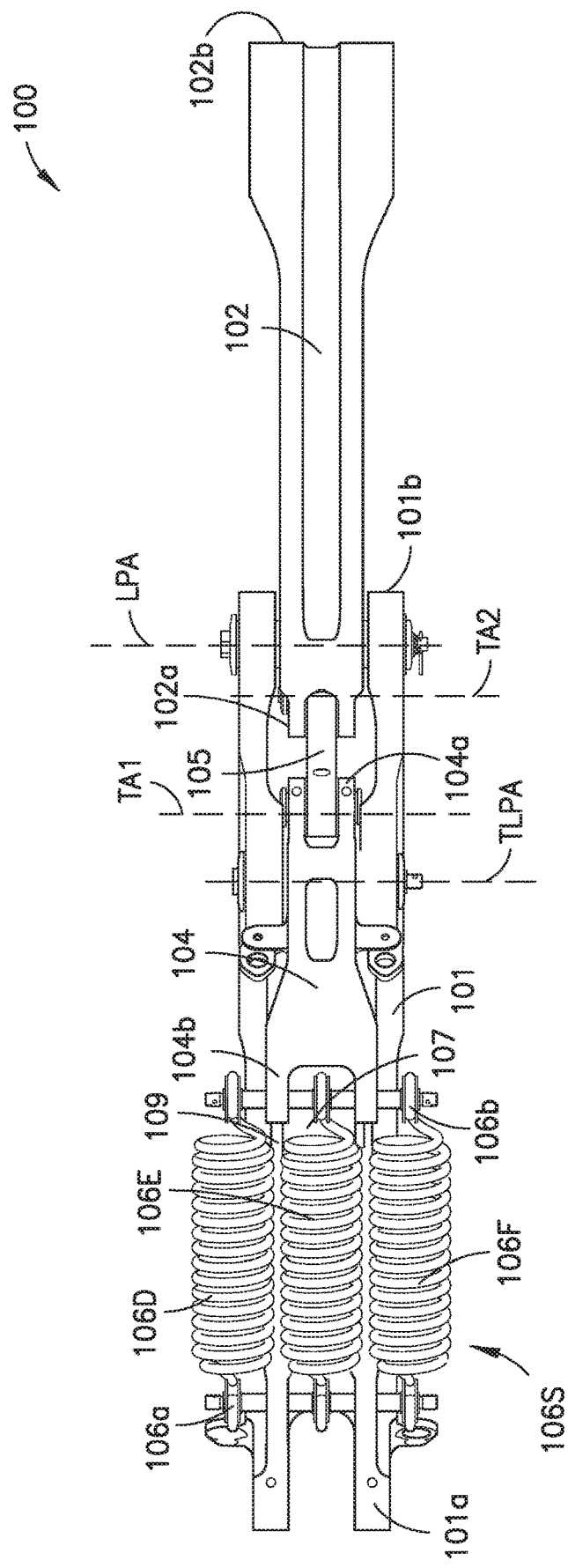
Figure 2D:
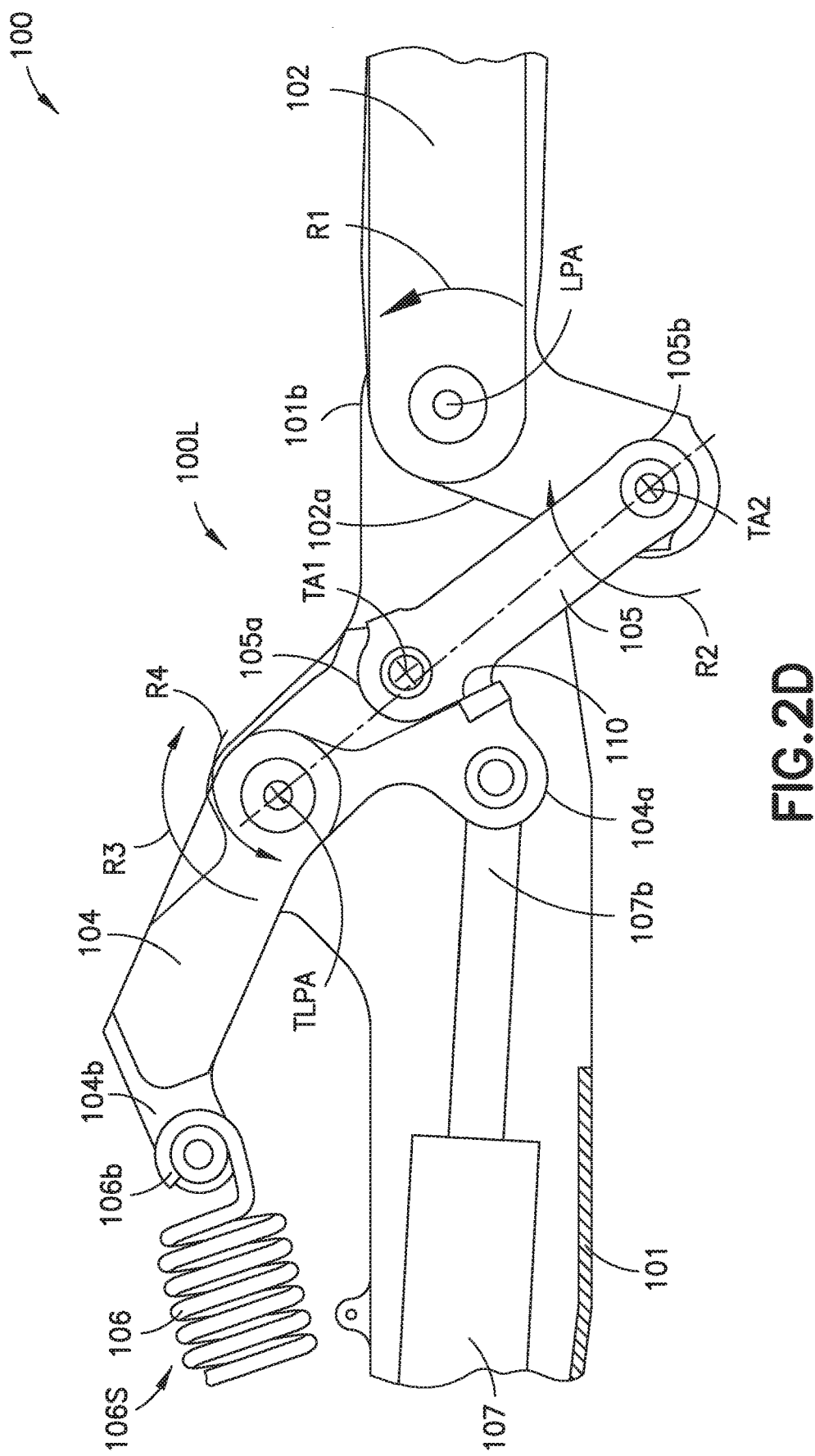

In a particular aspect as shown in FIGS. 2C and 6B, the at least one biasing member 106 includes two or more biasing members 106D-106F. Each of the two or more biasing members 106D-106F being substantially similar to the at least one biasing member 106 described above. While three biasing members are shown for exemplary purposes in other aspects, there may be more than three biasing members. In one aspect, the two or more biasing members 106D-106F are arranged in parallel and located on a common side of the first lock link 101, in a manner similar to that described above, which provides a more compact configuration of the landing gear lock assembly 100 compared to the conventional toggle lock mechanism.

In a particular aspect shown in FIGS. 2A-2D, the landing gear lock assembly 100 includes but one set of biasing members 106S coupled to both the first lock link 101 and the crank link 104, such that the but one set of biasing members 106S is the only set of biasing members 106 of the landing gear lock assembly 100. The but one set of biasing members 106S is located on a single or common side of the first lock link 101 in a manner similar to that described above. The but one set of biasing members 106S is substantially similar to the at least one biasing member 106 described above. Having but one set of biasing members 106S can provide a more compact configuration and may also reduce weight of the landing gear lock assembly 100 compared to, e.g., a conventional toggle lock mechanism.

Still referring to FIGS. 2A-D, the landing gear lock assembly 100 includes at least one actuator 107 coupled to both the first lock link 101 and the crank link 104. In one aspect, the actuator 107 includes a first end 107a coupled to the first lock link 101 and a second end 107b coupled to the crank link 104. The actuator is coupled to the first lock link 101 adjacent the first end 101a of the first lock link 101, but the actuator 107 may alternatively be coupled to any suitable location of the first lock link 101.

In one aspect, the first lock link 101 includes a recess or channel 109, the at least one actuator 107 being disposed within the recess 109, which can provide for a more compact configuration of the landing gear lock assembly 100 compared to a conventional toggle lock mechanism.

Referring also to FIGS. 4A-4C, the actuator 107 is coupled to the crank link 104 adjacent the first end 104a of the crank link 104 so that a force applied on the crank link 104 by the at least one biasing member 106 is on an opposite side of the crank link 104, relative to the toggle lock pivot axis TLPA, than a force applied to the crank link 104 by the actuator 107 (i.e. the at least one biasing member 106 and the actuator 107 are connected to the crank link 104 on opposite sides of the toggle lock pivot axis TLPA). In order to release the over center locked position 100L of the toggle lock mechanism 103, the at least one actuator 107 is configured to pull the first end 104a of the crank link 104 against the force of the at least one biasing member 106 being applied to the second end 104b of the crank link 104. Unlocking the over center locking allows the second lock link 102 to be retracted in any suitable manner to the fully retracted position.

In other aspects, referring now also to FIG. 5, the at least one biasing member 106 and the at least one actuator 107 are coupled to a common side, e.g., the second end 104b, of the crank link 104 relative to the toggle lock pivot axis TLPA. Here, the at least one actuator 107 is configured to push the crank link 104 against the force of the at least one biasing member 106 to release the locked toggle lock mechanism 103.

In other aspects, referring now also to FIG. 6A-6B, the two or more biasing members 106D-E are located on opposite sides of the first lock link 101 and the at least one actuator 107 is located between the two or more biasing members 106D-E. In this aspect, the at least one actuator 107 and two or more biasing members 106D-E cross one another so that the actuator 107 applies force to the second end 104b of the crank link 104 and two or more biasing members 106D-E apply force to the first end 104a of the crank link 104 (e.g., on opposites sides of the toggle lock pivot axis TLPA). Here, the actuator 107 pulls the crank link 104 to release the over center locking of the toggle lock mechanism 103. The crossed configuration may provide the at least one actuator 107 with a greater mechanical advantage, e.g., requiring less pull force to unlock the over center locked toggle lock mechanism 103 to reduce the size of actuator 107.

Referring now to FIGS. 2A-2D and 7, a method 700 for assembling the landing gear lock assembly 100 includes rotatably coupling the second end 101b of the first lock link 101 to the first end 102a of the second lock link 102 at a link pivot axis LPA disposed between the first end 102a and the second end 102b of the second lock link 102 so that the first and second lock links 101, 102 unfold relative to each other in the first rotation direction R1 (FIG. 7, Block 701). The crank link 104 and the toggle link 105 of the toggle lock mechanism 103 are rotatably coupled to each other about the first toggle link axis TA1 (FIG. 7, Block 702). The toggle link 105 is rotatably coupled to the second lock link 102 about the second toggle link axis TA2 and the crank link 104 is rotatably coupled to the first lock link 101 about the toggle lock pivot axis TLPA so that the toggle link 105 rotates relative to the second lock link 102, in the second rotation direction R2 opposite the first rotation direction R1. As described herein, the toggle link 105 is coupled to the crank link 104 and second lock link 102 to rotate the second lock link 102 about the link pivot axis LPA to a fully extended position of the second lock link 102 relative to the first lock link 101 (FIG. 7, Block 703).

In one aspect, assembling the landing gear lock assembly 100 includes coupling the at least one biasing member 106 to both the first lock link 101 and the crank link 104, such as in one of the configurations described above with respect to FIGS. 2A, 5, and 6A. For example, assembling the landing gear lock assembly 100 includes coupling the but one set of biasing members 106S to both the first lock link 101 and the crank link 104 so that the but one set of biasing members 106S are located on a common side of the first lock link 101.

In one aspect, assembling the landing gear lock assembly 100 includes disposing the at least one actuator 107 within the recess 109 of the first lock link 101 and coupling the at least one actuator 107 to both the first lock link 101 and the crank link 104, such as in one of the configurations described above with respect to FIGS. 2A, 5, and 6A. For example, assembling the landing gear lock assembly 100 includes coupling the first end 107a of the at least one actuator 107 to the first lock link 101 and the second end 107b of the at least one actuator 107 to the crank link 104.

In one aspect, assembling the landing gear lock assembly 100 includes coupling the at least one actuator 107 to both the first end 104a of the crank link 104 and the first lock link 101, and coupling the at least one biasing member 106 to both the first lock link 101 and the second end 104b of the crank link 104. Here, the first and second ends 104a, 104b of the crank link 104 are disposed on opposite sides of the toggle lock pivot axis TLPA as shown in, e.g., FIGS. 2A-2D.

In one aspect, assembling the landing gear lock assembly 100 includes coupling the at least one actuator 107 to both the second end 104b of the crank link 104 and the first lock link 101, and coupling the at least one biasing member 106 to both the second end 104b of the crank link 104 and the first lock link 101. Here, the at least one actuator 107 and the at least one biasing member 106 are coupled on the same side of the toggle lock pivot axis TLPA as shown in, e.g., FIG. 5.

In one aspect, assembling the landing gear lock assembly 100 includes coupling the at least one actuator 107 to both the first end 104a of the crank link 104 and the first lock link 101, and coupling the at least one biasing member 106 to both the second end 104b of the crank link 104 and the first lock link 101. Here, the at least one actuator 107 and the at least one biasing member 106 cross one another and apply forces on opposite sides of the toggle lock pivot axis TLPA as shown in, e.g., FIGS. 6A and 6B.

Referring again to FIGS. 1A-1C and 2A-2D, the first end 101a of the first lock link 101 is configured for coupling to a landing gear shock strut 1140 of the aircraft 1102 or to an aircraft frame or airframe 1118. In one aspect, the landing gear shock strut 1140 is located on the main landing gear 1100A, the nose landing gear 1100B, the tail landing gear 1100C, or any other suitable landing gear of the aircraft 1102. In one aspect, the second end 102b of the second lock link 102 is configured for coupling to one of a landing gear drag brace 1142 or landing gear sides brace 1144. In other aspects, the second end 102b of the second lock link 102 is configured to couple to the landing gear shock strut 1140 or the airframe 1118 and the first end 101a of the first lock link 101 is configured to couple to the landing gear drag brace 1142 or the landing gear side brace 1144.

As can be seen in FIGS. 1B-1C, 2A-2D, and 3A-3E and described above, the landing gear lock assembly 100 is a self-contained locking assembly functionally coupled to the aircraft 1102 by only the first lock link 101 and second lock link 102. The landing gear lock assembly 100 is self-contained, such that the at least one biasing member 106, at least one actuator 107, and the toggle lock mechanism 103 are all self-contained as a unit with the first and second lock links 101, 102 and are installed and removed from the aircraft 1102 as a unit and only coupled to the aircraft 1102 by the first and second lock link 101, 102.

Referring now to FIGS. 1A-1C, 3A-3E, 4A-C and 8, a method 800 for operating, for example, landing gear 1100A is illustrated. In one aspect, the landing gear 1100A is situated in a retracted/folded position within the airframe 1118. While the landing gear 1100A is in a retracted position, the landing gear lock assembly 100 is also in a retracted position as illustrated in FIGS. 1C and 3A.

The landing gear 1100 is extended by actuating any suitable actuator, such as landing gear actuator 1145 (see FIG. 1B), and/or by gravity. Extending the landing gear, with an actuator and/or by gravity, causes extension of the landing gear lock assembly 100 where actuator 107 is extended to cause rotation of the toggle lock mechanism 103 about the toggle lock pivot axis TLPA of the first lock link 101. In one aspect, gravitational forces acting on the landing gear cause extension of the actuator 107. Rotation of the toggle lock mechanism 103 in turn causes rotation of the second lock link 102, which is rotatably coupled to the first lock link 101 (FIG. 8, Block 801). As the second lock link 102 rotates, the second lock link 102 unfolds relative to the first lock link 101 in the first rotation direction R1 (FIG. 8, Block 802). The toggle link 105 of the toggle lock mechanism 103 rotates relative to the second lock link 102, in the second rotation direction R2 opposite the first rotation direction R1, rotating the second lock link 102 to a fully extended position relative to the first lock link 101 (FIG. 8, Block 803); where the crank link 104 and the toggle link 105 unfold in a direction opposite the lock links 101, 102. A moment M is applied to the crank link 104 of the toggle lock mechanism 103 with the at least one biasing member 106 and further rotates the toggle lock mechanism 103 in the second rotation direction R2. Further rotating the toggle lock mechanism 103 causes rotation of the second lock link 102 to the fully extended position and causes a mechanical locking of the second lock link 102 (FIG. 8, Block 804).

As illustrated in FIGS. 3A-3E and 4A-4C, transitioning the landing gear lock assembly 100 from a retracted position to an extended position over a sweep angle θ of the second lock link 102 causes a stretching of the at least one biasing member 106 from a substantially relaxed and retracted configuration (FIG. 3A) to an extended configuration (FIGS. 3B-3D) and back to a substantially relaxed and retracted configuration (FIG. 3E). In a particular aspect, the second lock link 102 has a sweep angle θ of about 150 degrees from a fully retracted position to fully extended position; however, in other aspects the sweep angle θ of the second lock link 102 may be more or less than about 150 degrees.

As seen in FIG. 3A, the landing gear lock assembly 100 is in a retracted position and the at least one biasing member 106 is in a relaxed and retracted configuration (i.e. a minimum length). When the landing gear lock assembly 100 is unfolded from the retracted position, the crank link 104 of the toggle lock mechanism 103 begins rotation in the rotation direction R3 about toggle link axis TLPA relative to the first lock link 101 and the second lock link 102 begins rotation in rotation direction R1 about link pivot axis LPA. The at least one biasing member 106 transitions from a minimum length at the retracted configuration to a maximum length, as seen in FIGS. 3B and 4A. When the at least one biasing member is at the maximum length the landing gear brace has a brace angle α of, for example, about 150 degrees. In other aspects, the brace angle α may be more or less than about 150 degrees. The maximum length of the at least one biasing member 106 may be a full rated extension length, which is described in greater detail below. In another aspect, the maximum length of the at least one biasing member 106 may be a length defined by a bi-directional rotational movement of the crank link 104.

The crank link 104 of the toggle lock mechanism 103 bi-directionally rotates relative to the first lock link 101 during the extension of the landing gear lock assembly 100, while the toggle link 105 rotates in rotation direction R2 relative to the second lock link 102 throughout the extension of the landing gear lock assembly 100. For example, the crank link 104 may rotate in rotation direction R3 about toggle link pivot axis TLPA to a point in the extension of the landing gear lock assembly 100 (e.g. about 60% of the sweep angle θ or full extension of the second lock link 102 relative to the first lock link 101) where the toggle link 105 is substantially in the position shown in FIG. 3B. As shown in FIG. 3B, at about 60% of sweep angle θ of the second lock link 102 (in other aspects, reverse rotation of the crank link may occur before or later than about 60% of sweep angle θ), the crank link 104 may begin to rotate about toggle link pivot axis TLPA in direction R4 relative to the first lock link 101, noting that the position of the crank link 104 at the transition between rotation directions R3 and R4, in one aspect, defines the maximum length of the at least one biasing member 106.

The configuration of the landing gear lock assembly 100 causes lost motion in the toggle lock mechanism 103 during the transition of the crank link 104 from rotation direction R3 to rotation direction R4, as evidenced in a comparison between FIGS. 3B and 3C (e.g. from about 60% of sweep angle θ to about 80-90% of sweep angle θ of the second lock link 102). During the lost motion of the landing gear lock assembly 100 the at least one biasing member 106 substantially may not continue to extend or retract or, in other aspects, the extension/retraction of the at least one biasing member is significantly less than the travel of the second lock link 102 relative to the first lock link 101. For example, in one aspect, as the second lock link 102 rotates about link pivot axis LPA in rotation direction R1 from about 60% to about 90% of sweep angle θ (or in other aspects from about 60% to about 80% of sweep angle θ—e.g., the extended configuration of the at least one biasing member 106 occurs at about 80% to about 90% of a sweep angle θ) the at least one biasing member 106 may have an extended configuration that is substantially equal to a length that is about 75% to about 100% of the full rated extension length of the at least one biasing member 106. In one aspect, the extended configuration may be about 80% or about 85% of the full rated extension length. In another aspect, the at least one biasing member 106 may have an extended configuration that is substantially equal to a length that is about 75% to about 100% of the length of the at least one biasing member 106 defined by the bi-directional rotation of the crank link 104. In one aspect, the extended configuration may be about 80% or about 85% of the length of the at least one biasing member 106 defined by the bi-directional rotation of the crank link 104.

In one aspect, the full rated extension length of the spring is the designed for/desired extended length of the spring that is calculated using the following formula:

$$FREL = LIH + (L/k).$$

FREL is the full rated extension length of the spring, L is the load applied to the spring, k is the spring rate, and LIH is the length of the extension spring inside the hooks of the extension spring. Alternatively, the full rated extension length of the spring may be the maximum length the spring can be extended to repeatedly while maintaining a predetermined service life.

In one aspect, the extended configuration of the at least one biasing member 106 occurs at a brace angle α, of about 170 degrees, while in other aspects, the extended configuration of the at least one biasing member 106 may occur at a brace angle α of more or less than about 170 degrees.

In one aspect, a maximum force applied to the landing gear lock assembly 100 by the at least one biasing member 106 is needed at about 80% to about 90% of the full extension of the second lock link 102 to lock the landing gear in an extended configuration. As noted above, the lost motion of the toggle lock mechanism 103 maintains the at least one biasing member 106 at about 75% to about 100% of its full rated extension or maximum length (which means that 75% to about 100% of the spring stroke (and corresponding force) is utilized by the landing gear lock assembly 100, which is over about 15% more utilized spring stroke than the conventional landing gear lock discussed above. As described herein, at about the full extension of the second lock link 102 relative to the first lock link 101, the at least one biasing member 106 applies a force to the crank link 104 of the toggle lock mechanism 103 to rotate the toggle link 105 to an over-center position mechanically locking the landing gear lock assembly 100 and the landing gear in the extended configuration.

Referring now to FIGS. 1A-1C, 3A-3E, 4A-4C and 9, a method 900 for operating, for example, main landing gear 1100A is illustrated. In one aspect, the main landing gear 1100A is situated in an extended/unfolded position outside of the airframe 1118. While the main landing gear 1100A is in the extended position, the landing gear lock assembly 100 is also in an extended and locked position as illustrated in FIG. 3E.

In order to retract the landing gear, for example after takeoff, a sequence opposite that illustrated in FIGS. 3A-3E is initiated by, in one aspect, actuating an actuator 107 to apply force to the crank link 104 of the toggle lock mechanism 103, such as by retracting the actuator, to rotate the crank link 104 of the toggle lock mechanism 103 in rotation direction R3 about toggle lock pivot axis TLPA against the biasing moment M of the at least one biasing member 106 causing a mechanical unlocking (e.g., the unlocking of the over center locked position of the toggle link 105) of the second lock link 102 from the fully extended position illustrated in FIG. 3E and causing rotation of the second lock link 102 away from the fully extended position illustrated in FIG. 3E (FIG. 9, Block 901). The actuator 107 is retracted to rotate the toggle lock mechanism 103 about the toggle lock pivot axis TLPA of the first lock link 101, causing rotation of the second lock link 102 in a direction substantially opposite rotation direction R1 (FIG. 9, Block 902). As the second lock link 102 is rotated, the second lock link 102 folds relative to the first lock link 101 in the direction substantially opposite the rotation direction R1 (FIG. 9, Block 903). The toggle link 105 of the toggle lock mechanism 103 rotates about second toggle link axis TA2 relative to the second lock link 102, in a rotation direction that is substantially opposite rotation direction R2, to rotate the second lock link 102 to the fully retracted position of the second lock link 102, illustrated in FIG. 3A, relative to the first lock link 101 (FIG. 9, Block 904). In one aspect, the landing gear actuator 1145 is actuated coincident with actuator 107 to retract the landing gear into the airframe 1118.

As the landing gear lock assembly 100 retracts/folds to the fully retracted position, the at least one biasing member 106 transitions between relaxed and extended configurations in a manner substantially similar to that described above when the landing gear lock assembly 100 is extended/unfolded.

Examples of the present disclosure may be described in the context of aircraft manufacturing and service method 1000 as shown in FIG. 10. In other aspects, the examples of the present disclosure may be applied in any suitable industry, such as e.g. automotive, maritime and aerospace, With respect to aircraft manufacturing, during pre-production, illustrative method 1000 may include specification and design (FIG. 10, Block 1004) of aircraft 1102 and material procurement (FIG. 10, Block 1006). During production, component and subassembly manufacturing (FIG. 10, Block 1008) and system integration (FIG. 10, Block 1010) of aircraft 1102 may take place, which may include manufacturing and installation of the landing gear lock assembly 100. Thereafter, aircraft 1102 may go through certification and delivery (FIG. 10, Block 1012) to be placed in service (FIG. 10, Block 1014). While in service, aircraft 1102 may be scheduled for routine maintenance and service (FIG. 10, Block 1016). Routine maintenance and service may include modification, reconfiguration, refurbishment, etc. of one or more systems of aircraft 1102, which may include installation of the landing gear lock assembly 100 as described herein.

Each of the processes of illustrative method 1000 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 1000. For example, components or subassemblies corresponding to component and subassembly manufacturing (FIG. 10, Block 1008) may be fabricated or manufactured in a manner similar to components or subassemblies produced while aircraft 1102 is in service (FIG. 10, Block 1014). Also, one or more examples of the apparatus(es), method(s), or combination thereof may be utilized during production of the aircraft 1102, for example, by substantially expediting assembly of or reducing the cost of aircraft 1102. Similarly, one or more examples of the apparatus or method realizations, or a combination thereof, may be utilized, for example and without limitation, while aircraft 1102 is in service (FIG. 10, Block 1014) and/or during maintenance and service (FIG. 10, Block 1016).

The following are provided in accordance with the aspects of the present disclosure:

A1. A landing gear lock assembly comprising:
a first lock link having a first end and a second end;
a second lock link having a first end and a second end, the first end of the second lock link being rotatably coupled to the second end of the first lock link so that the first and second lock links unfold relative to each other in a first rotation direction; and
a toggle lock mechanism having a crank link and a toggle link rotatably coupled to each other at a toggle link axis, the toggle link being rotatably coupled to the second lock link, and the crank link being rotatably coupled to the first lock link so that the toggle link rotates relative to the second lock link, in a second rotation direction opposite the first rotation direction, to rotate the second lock link to a fully extended position of the second lock link relative to the first lock link; where rotation of the toggle link in the second rotation direction mechanically locks the second lock link in the fully extended position.

A2. The landing gear lock assembly of paragraph A1, further comprising at least one biasing member coupled to both the first lock link and the crank link.

A3. The landing gear lock assembly of paragraph A2, wherein the at least one biasing member comprises two or more biasing members located on a common side of the first lock link.

A4. The landing gear lock assembly of paragraph A3, wherein the two or more biasing members are arranged in parallel.

A5. The landing gear lock assembly of paragraph A2, wherein the at least one biasing member is in a substantially relaxed state when the second lock link is in a fully retracted position.

A6. The landing gear lock assembly of paragraph A2, wherein the at least one biasing member is in a substantially relaxed state when the second lock link is in the fully extended position.

A7. The landing gear lock assembly of paragraph A2, wherein the at least one biasing member comprises an extension spring.

A8. The landing gear lock assembly of paragraph A2, wherein the at least one biasing member comprises a coil spring.

A9. The landing gear lock assembly of paragraph A1, further comprising but one set of biasing members coupled to both the first lock link and the crank link, the but one set of biasing members being located on a common side of the first lock link.

A10. The landing gear lock assembly of paragraph A9, wherein each biasing member in the but one set of biasing members is in a relaxed state when the second lock link is in a fully retracted position.

A11. The landing gear lock assembly of paragraph A9, wherein each biasing member in the but one set of biasing members is in a relaxed state when the second lock link is in the fully extended position.

A12. The landing gear lock assembly of paragraph A9, wherein the but one set of biasing members is located on a side of the first lock link opposite a sweep path of the second lock link.

A13. The landing gear lock assembly of paragraph A1, further comprising at least one actuator having a first end coupled to the first lock link and a second end coupled to the crank link.

A14. The landing gear lock assembly of paragraph A13, wherein the crank link has a first end and a second end and a toggle lock pivot axis disposed between the first end and second end of the crank link, the crank link being rotatably coupled to the first lock link about the toggle lock pivot axis and the at least one actuator is coupled to the first end of the crank link, the landing gear lock assembly further comprises at least one biasing member having a first end coupled to the first lock link and a second end coupled to the second end of the crank link.

A15. The landing gear lock assembly of paragraph A14, wherein the toggle link is rotatably coupled to the crank link at the first end of the crank link.

A16. The landing gear lock assembly of paragraph A13, wherein the first lock link includes a recess, the at least one actuator being disposed within the recess.

A17. The landing gear lock assembly of paragraph A1, wherein the second lock link is rotatably coupled to the first lock link at a link pivot axis disposed between the first end and the second end of the second lock link.

A18. The landing gear lock assembly of paragraph A1, wherein the first end of the first lock link is configured for coupling to a landing gear shock strut and the second end of the second lock link is configured for coupling to one of a landing gear drag brace or a landing gear side brace.

A19. The landing gear lock assembly of paragraph A1, wherein the first end of the first lock link is configured for coupling to one of a landing gear drag brace or a landing gear side brace and the second end of the second lock link is configured for coupling to a landing gear shock strut.

A20. The landing gear lock assembly of paragraph A1, wherein the first end of the first lock link is configured for coupling to an aircraft frame and the second end of the second lock link is configured for coupling to one of a landing gear drag brace or a landing gear side brace.

A21. The landing gear lock assembly of paragraph A1, wherein the crank link includes a toggle stop configured to contact the toggle link at an over center locked position of the landing gear lock assembly.

A22. The landing gear lock assembly of paragraph A1, wherein the landing gear lock assembly comprises a self-contained locking assembly functionally mounted to an aircraft by only the first lock link and second lock link.

A23. The landing gear lock assembly of paragraph A1, wherein the crank link and the toggle link of the toggle lock mechanism are configured to unfold in a direction opposite the first rotation direction.

B1. A method of assembling a landing gear lock assembly, the method comprising:
rotatably coupling a second end of a first lock link to a first end of a second lock link so that the first and second lock links unfold relative to each other in a first rotation direction;
rotatably coupling a crank link and a toggle link of a toggle lock mechanism to each other;
rotatably coupling the toggle link to the second lock link and rotatably coupling the crank link to the first lock link so that the toggle link rotates relative to the second lock link, in a second rotation direction opposite the first rotation direction, to rotate the second lock link to a fully extended position of the second lock link relative to the first lock link; and
wherein the second lock link mechanically locks in the fully extended position with rotation of the toggle link in the second rotation direction.

B2. The method of paragraph B1, further comprising coupling at least one biasing member to both the first lock link and the crank link.

B3. The method of paragraph B1, further comprising coupling but one set of biasing members to both the first lock link and the crank link so that the but one set of biasing members are located on a common side of the first lock link.

B4. The method of paragraph B1, further comprising coupling a first end of at least one actuator to the first lock link and a second end of the at least one actuator to the crank link.

B5. The method of paragraph B4, further comprising disposing the at least one actuator within a recess of the first lock link.

B6. The method of paragraph B1, further comprising:
coupling at least one actuator to both a first end of the crank link and the first lock link; and coupling at least one biasing member to both the first lock link and a second end of the crank link, where the first and second ends of the crank link are disposed on opposite sides of a toggle lock pivot axis.

B7. The method of paragraph B6, wherein rotatably coupling the crank link and the toggle link of the toggle lock mechanism to each other comprises rotatably coupling the toggle link to the crank link at the first end of the crank link.

B8. The method of paragraph B1, wherein rotatably coupling a second end of a first lock link to a first end of a second lock link comprises coupling the second lock link to the first lock link at a link pivot axis disposed between the first end and a second end of the second lock link.

B9. The method of paragraph B1, further comprising coupling a first end of the first lock link to a landing gear shock strut and coupling the second end of the second lock link to one of a landing gear drag brace or a landing gear side brace.

C1. A method for operating a landing gear, the method comprising:
extending an actuator to rotate a toggle lock mechanism about a toggle lock pivot axis of a first lock link, causing rotation of a second lock link that is rotatably coupled to the first lock link so that
the second lock link unfolds relative to the first lock link in a first rotation direction, and
a toggle link of the toggle lock mechanism rotates relative to the second lock link, in a second rotation direction opposite the first rotation direction, to rotate the second lock link to a fully extended position of the second lock link relative to the first lock link; and
applying a force to a crank link of the toggle lock mechanism with at least one biasing member to further rotate the toggle lock mechanism in the second rotation direction causing rotation of the second lock link to the fully extended position and causing a mechanical locking of the second lock link in the fully extended position;
wherein the toggle link couples the crank link to the second lock link, the actuator is coupled to both the first lock link and the crank link, and the at least one biasing member is coupled to both the first lock link and the crank link.

C2. The method of paragraph C1, wherein applying the force to the crank link of the toggle lock mechanism with the at least one biasing member comprises applying the force with at least two biasing members.

C3. The method of paragraph C1, wherein applying the force to the crank link of the toggle lock mechanism with the at least one biasing member comprises applying the force with but one set of biasing members on a common side of the first lock link.

C4. The method of paragraph C1, wherein applying the force to the crank link of the toggle lock mechanism with the at least one biasing member comprises applying the force with but one set of biasing members located on a side of the first lock link opposite a sweep path of the second lock link.

C5. The method of paragraph C1, wherein extending the actuator applies a force to the crank link on a first end of the crank link and the force applied to the crank link by the at least one biasing member is applied to a second end of the crank link, where the first and second ends of the crank link are located on opposite sides of a toggle lock pivot axis.

C6. The method of paragraph C1, wherein the crank link and the toggle link of the toggle lock mechanism are configured to unfold in a direction opposite the first rotation direction.

C7. The method of paragraph C1, wherein the mechanical locking of the second lock link in the fully extended position is caused by an over center locking of the toggle link and crank link.

C8. The method of paragraph C7, further comprising retracting the actuator to unlock the over center locking of the toggle link and crank link to retract the second lock link to the fully retracted position.

C9. The method of paragraph C1, further comprising transitioning the at least one biasing member from a substantially relaxed configuration to an extended configuration and back to a substantially relaxed configuration during extension of the second lock link from a fully retracted position to the fully extended position.

C10. The method of paragraph C9, wherein the extended configuration is about 75% to about 100% of a length of the at least one biasing member at full rated extension of the at least one biasing member.

C11. The method of paragraph C10, wherein the extended configuration occurs at about 80% to about 90% of a sweep angle of the second lock link from a fully retracted position to the fully extended position.

C12. The method of paragraph C, wherein the actuator is extended by gravitational force acting on the landing gear.

D1. A method for operating a landing gear, the method comprising:
extending an actuator to apply a force to a crank link of a toggle lock mechanism to rotate the toggle lock mechanism in a first rotation direction against a biasing force of at least one biasing member causing a mechanical unlocking of a second lock link from the fully extended position and causing rotation of the second lock link away from the fully extended position;
retracting the actuator to rotate the toggle lock mechanism about a toggle lock pivot axis of a first lock link, causing rotation of the second lock link that is rotatably coupled to the first lock link so that
the second lock link folds relative to the first lock link in a second rotation direction, and
a toggle link of the toggle lock mechanism rotates relative to the second lock link, in the first rotation direction opposite the second rotation direction, to rotate the second lock link to a fully retracted position of the second lock link relative to the first lock link; and
wherein the toggle link couples the crank link to the second lock link, the actuator is coupled to both the first lock link and the crank link, and the at least one biasing member is coupled to both the first lock link and the crank link.

D2. The method of paragraph D1, wherein the biasing force applied to the crank link of the toggle lock mechanism with the at least one biasing member is applied with at least two biasing members.

D3. The method of paragraph D1, wherein the biasing force applied to the crank link of the toggle lock mechanism with the at least one biasing member is applied with but one set of biasing members on a common side of the first lock link.

D4. The method of paragraph D1, wherein the biasing force applied to the crank link of the toggle lock mechanism with the at least one biasing member is applied with but one set of biasing members located on a side of the first lock link opposite a sweep path of the second lock link.

D5. The method of paragraph D1, wherein retracting the actuator applies a force to the crank link on a first end of the crank link and the force applied to the crank link by the at least one biasing member is applied to a second end of the crank link, where the first and second ends of the crank link are located on opposite sides of a toggle lock pivot axis.

D6. The method of paragraph D1, wherein the crank link and the toggle link of the toggle lock mechanism are configured to fold in a direction opposite the second rotation direction.

D7. The method of paragraph D1, wherein the mechanical unlocking of the second lock link from the fully extended position is caused by releasing an over center locking of the toggle link and crank link.

D8. The method of paragraph D1, further comprising transitioning the at least one biasing member from a substantially relaxed configuration to an extended configuration and back to a substantially relaxed configuration during retraction of the second lock link from the fully extended position to a fully retracted position.

D9. The method of paragraph D8, wherein the extended configuration is about 75% to about 100% of a length of the at least one biasing member at full rated extension of the at least one biasing member.

D10. The method of paragraph D9, wherein the extended configuration occurs at about 80% to about 90% of a sweep angle of the second lock link from the fully retracted position to the fully extended position.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 7-10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 7-10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A method for operating a landing gear, the method comprising:
   extending an actuator to apply a force to a crank link of a toggle lock mechanism to rotate the toggle lock mechanism in a first rotation direction against a biasing force of at least one biasing member causing a mechanical unlocking of a second lock link from a fully extended position and causing rotation of the second lock link away from the fully extended position;
   retracting the actuator to rotate the toggle lock mechanism about a toggle lock pivot axis of a first lock link, causing rotation of the second lock link that is rotatably coupled to the first lock link so that
      the second lock link folds relative to the first lock link in a second rotation direction, and
      a toggle link of the toggle lock mechanism rotates relative to the second lock link, in the first rotation direction opposite the second rotation direction, to rotate the second lock link to a fully retracted position of the second lock link relative to the first lock link; and
   wherein:
      the first lock link and the second lock link are distinct from a landing gear shock strut of the landing gear, and
      the toggle link couples the crank link to the second lock link, the actuator is coupled to both the first lock link and the crank link, and the at least one biasing member is coupled to both the first lock link and the crank link.

2. The method of claim 1, wherein the biasing force applied to the crank link of the toggle lock mechanism with the at least one biasing member is applied with at least two biasing members.

3. The method of claim 1, wherein the biasing force applied to the crank link of the toggle lock mechanism with the at least one biasing member is applied with but one set of biasing members on a common side of the first lock link.

4. The method of claim 1, wherein the biasing force applied to the crank link of the toggle lock mechanism with the at least one biasing member is applied with but one set of biasing members located on a side of the first lock link opposite a sweep path of the second lock link.

5. The method of claim 1, wherein retracting the actuator applies a force to the crank link on a first end of the crank link and the force applied to the crank link by the at least one biasing member is applied to a second end of the crank link, where the first and second ends of the crank link are located on opposite sides of a toggle lock pivot axis.

6. The method of claim 1, wherein the crank link and the toggle link of the toggle lock mechanism are configured to fold in a direction opposite the second rotation direction.

7. The method of claim 1, wherein the mechanical unlocking of the second lock link from the fully extended position is caused by releasing an over center locking of the toggle link and crank link.

8. The method of claim 1, further comprising transitioning the at least one biasing member from a substantially relaxed configuration to an extended configuration and back to a substantially relaxed configuration during retraction of the second lock link from the fully extended position to a fully retracted position.

9. The method of claim 8, wherein the extended configuration is about 75% to about 100% of a length of the at least one biasing member at full rated extension of the at least one biasing member.

10. The method of claim 9, wherein the extended configuration occurs at about 80% to about 90% of a sweep angle of the second lock link from the fully retracted position to the fully extended position.

11. An aircraft comprising:
   a landing gear having a landing gear shock strut; and
   a landing gear lock assembly for the landing gear, the landing gear lock assembly comprising:
      a first lock link having a first end and a second end;
      a second lock link having a first end and a second end, the first end of the second lock link being rotatably coupled to the second end of the first lock link so that the first and second lock links unfold relative to each other in a first rotation direction, where both the first lock link and the second lock link are distinct from the landing gear shock strut; and
      a toggle lock mechanism having a crank link and a toggle link rotatably coupled to each other at a toggle link axis, the toggle link being rotatably coupled to the second lock link, and the crank link being rotatably coupled to the first lock link so that the toggle link rotates relative to the second lock link, in a second rotation direction opposite the first rotation direction, to mechanically lock the second lock link in a fully extended position.

12. The aircraft of claim 11, further comprising at least one biasing member coupled to both the first lock link and the crank link.

13. The aircraft of claim 12, wherein the at least one biasing member comprises two or more biasing members located on a common side of the first lock link.

14. The aircraft of claim 12, wherein the at least one biasing member is in a substantially relaxed state when the second lock link is in a fully retracted position.

15. The aircraft of claim 12, wherein the at least one biasing member is in a substantially relaxed state when the second lock link is in the fully extended position.

16. The aircraft of claim 11, further comprising at least one actuator having a first end coupled to the first lock link and a second end coupled to the crank link.

17. The aircraft of claim 16, wherein the crank link has a first end and a second end and a toggle lock pivot axis disposed between the first end and second end of the crank link, the crank link being rotatably coupled to the first lock link about the toggle lock pivot axis and the at least one actuator is coupled to the first end of the crank link, the landing gear lock assembly further comprises at least one biasing member having a first end coupled to the first lock link and a second end coupled to the second end of the crank link.

18. The aircraft of claim 16, wherein the first lock link includes a recess, the at least one actuator being disposed within the recess.

19. The aircraft of claim 11, wherein the landing gear lock assembly comprises a self-contained locking assembly functionally mounted to an aircraft by only the first lock link and second lock link.

20. The aircraft of claim 11, wherein the crank link and the toggle link of the toggle lock mechanism are configured to unfold in a direction opposite the first rotation direction.

* * * * *